(12) United States Patent
Davison

(10) Patent No.: US 9,405,736 B1
(45) Date of Patent: *Aug. 2, 2016

(54) METHOD AND SYSTEM FOR AUTOMATICALLY DOWNLOADING AND STORING MARKUP LANGUAGE DOCUMENTS INTO A FOLDER BASED DATA STRUCTURE

(71) Applicant: Vertical Computer Systems, Inc., Richardson, TX (US)

(72) Inventor: Jeff Davison, Rockledge, FL (US)

(73) Assignee: Vertical Computer Systems, Inc., Richardson, TX (US)

( * ) Notice: Subject to any disclaimer, the term of this patent is extended or adjusted under 35 U.S.C. 154(b) by 111 days.

This patent is subject to a terminal disclaimer.

(21) Appl. No.: 14/072,635

(22) Filed: Nov. 5, 2013

Related U.S. Application Data

(63) Continuation of application No. 09/888,329, filed on Jun. 22, 2001, now Pat. No. 8,578,266, which is a continuation-in-part of application No. 09/882,494, filed on Jun. 15, 2001, now Pat. No. 7,076,521.

(60) Provisional application No. 60/214,067, filed on Jun. 26, 2000, provisional application No. 60/235,458, filed on Sep. 26, 2000.

(51) Int. Cl.
| | |
|---|---|
| *G06F 17/00* | (2006.01) |
| *G06F 17/22* | (2006.01) |
| *G06F 17/24* | (2006.01) |
| *G06F 17/30* | (2006.01) |

(52) U.S. Cl.
CPC ............ *G06F 17/2247* (2013.01); *G06F 17/24* (2013.01); *G06F 17/2235* (2013.01); *G06F 17/3089* (2013.01); *G06F 17/30861* (2013.01); *G06F 17/30896* (2013.01); *G06F 17/30905* (2013.01)

(58) Field of Classification Search
None
See application file for complete search history.

(56) References Cited

U.S. PATENT DOCUMENTS

| | | | |
|---|---|---|---|
| 5,574,898 A | | 11/1996 | Leblang et al. |
| 5,701,137 A | * | 12/1997 | Kiernan ................. G06F 9/4443 715/853 |

(Continued)

OTHER PUBLICATIONS

Banerjee S. et al., "Oracle8i—the XML enabled data management system" Data Engineering, 2000. Proceedings, 16th International Conference of San Diego, CA USA, Feb. 29-Mar. 3, 2000, Los Alamitos, CA, USA IEEE Computer Society, US, Feb. 29, 2000, pp. 561-568.

(Continued)

*Primary Examiner* — Cesar Paula
*Assistant Examiner* — David Faber
(74) *Attorney, Agent, or Firm* — Jack D. Stone, Jr.; Scheef & Stone, L.L.P.

(57) ABSTRACT

The present invention is directed to a system and method for processing a markup language file having one or more portions. Specifically, the system downloads a first markup language file using the hyper text transfer protocol and references the first markup language file by its uniform resource location or by a name of a local file on a system on which a user is operating. The first markup language is parsed for one or more portions of the first markup language file. Each portion of the first markup language file is stored into a directory structure containing folders, subfolders, and files complying with the structure of the first markup language file.

20 Claims, 16 Drawing Sheets

(56) References Cited

U.S. PATENT DOCUMENTS

| | | | |
|---|---|---|---|
| 5,793,966 A | 8/1998 | Amstein et al. | |
| 5,801,702 A * | 9/1998 | Dolan | G06F 17/30855 |
| | | | 707/E17.013 |
| 5,886,693 A | 3/1999 | Ho et al. | |
| 5,890,171 A * | 3/1999 | Blumer | G06F 17/24 |
| | | | 715/229 |
| 5,935,210 A * | 8/1999 | Stark | G06F 17/3089 |
| | | | 707/E17.116 |
| 5,963,208 A * | 10/1999 | Dolan | G06F 17/30855 |
| | | | 707/E17.013 |
| 5,974,418 A * | 10/1999 | Blinn | G06F 17/30569 |
| | | | 705/26.1 |
| 5,983,268 A * | 11/1999 | Freivald | G06F 17/30899 |
| | | | 707/E17.116 |
| 6,009,436 A * | 12/1999 | Motoyama | G06F 17/2247 |
| 6,043,817 A * | 3/2000 | Bolnick | G06F 3/0481 |
| | | | 715/788 |
| 6,131,122 A * | 10/2000 | Sampson | H04L 67/06 |
| | | | 707/999.01 |
| 6,148,311 A * | 11/2000 | Wishnie | G06F 17/3089 |
| | | | 706/45 |
| 6,185,588 B1 * | 2/2001 | Olson-Williams | G06F 17/30896 |
| | | | 707/E17.118 |
| 6,199,071 B1 * | 3/2001 | Nielsen | G06F 17/30882 |
| 6,230,173 B1 * | 5/2001 | Ferrel | G06F 17/218 |
| | | | 715/205 |
| 6,456,308 B1 | 9/2002 | Agranat et al. | |
| 6,510,461 B1 * | 1/2003 | Nielsen | H04L 12/18 |
| | | | 709/223 |
| 6,529,501 B1 | 3/2003 | Zhao et al. | |
| 6,538,673 B1 * | 3/2003 | Maslov | G06F 17/30899 |
| | | | 707/E17.116 |
| 6,546,406 B1 | 4/2003 | DeRose et al. | |
| 6,549,952 B1 * | 4/2003 | Plassmann | H04L 67/02 |
| | | | 719/311 |
| 6,560,639 B1 * | 5/2003 | Dan | G06F 17/3089 |
| | | | 707/999.01 |
| 6,567,918 B1 * | 5/2003 | Flynn | G06F 21/51 |
| | | | 726/7 |
| 6,578,078 B1 * | 6/2003 | Smith | G06F 17/3089 |
| | | | 707/999.01 |
| 6,604,100 B1 | 8/2003 | Fernandez et al. | |
| 6,629,135 B1 * | 9/2003 | Ross, Jr. | G06Q 30/0274 |
| | | | 709/218 |
| 6,665,658 B1 * | 12/2003 | DaCosta | G06F 17/30864 |
| 6,684,369 B1 * | 1/2004 | Bernardo | G06F 17/211 |
| | | | 707/E17.116 |
| 6,763,496 B1 | 7/2004 | Hennings et al. | |
| 6,779,151 B2 * | 8/2004 | Cahill | G06F 17/246 |
| | | | 707/999.002 |
| 6,785,673 B1 * | 8/2004 | Fernandez | G06F 17/2247 |
| 6,801,222 B1 * | 10/2004 | Dunham | G06F 9/4446 |
| | | | 715/708 |
| 6,826,553 B1 * | 11/2004 | DaCosta | G06F 17/30867 |
| 6,839,702 B1 * | 1/2005 | Patel | G06F 17/30905 |
| 6,857,102 B1 * | 2/2005 | Bickmore | G06F 17/2247 |
| | | | 707/E17.121 |
| 6,901,403 B1 * | 5/2005 | Bata | G06F 17/30572 |
| 6,925,470 B1 * | 8/2005 | Sangudi | G06F 17/30917 |
| 6,941,521 B2 * | 9/2005 | Lin | G06F 8/38 |
| | | | 715/234 |
| 7,266,512 B2 * | 9/2007 | Cohn | G06Q 30/06 |
| | | | 705/26.44 |
| 2002/0032700 A1 * | 3/2002 | Ebata | G06F 17/24 |
| | | | 715/234 |
| 2002/0046273 A1 | 4/2002 | Lahr et al. | |
| 2002/0065814 A1 * | 5/2002 | Okamoto | G06F 17/30911 |
| 2003/0037069 A1 * | 2/2003 | Davison | G06F 17/30893 |
| 2004/0128300 A1 * | 7/2004 | Fong | G06F 17/30607 |
| 2004/0260687 A1 * | 12/2004 | Mano | G06F 17/30696 |
| 2005/0235197 A1 * | 10/2005 | Betts | G06F 17/30917 |
| | | | 715/256 |
| 2006/0004780 A1 * | 1/2006 | Maeda | G06F 17/30864 |

OTHER PUBLICATIONS

Cheng, J. et al: "XML and DB2" Data Engineering, 2000. Proceedings. 16th Int'l Conference on San Diego, CA, USA Feb. 29-Mar. 3, 2000, Los Alamitos, C, USA, IEEE Computer Society, US Feb. 29, 2000, pp. 561-568.

Shi-Ming Huang, et al.: "Developing an XML gateway for business-to-business commerce" Web Information Systems Engineering, 2000. Proceedings of the First Int'l Conference on Hong Kong, China, Jun. 19-21, 2000, Los Alamitos, C, USA, IEE Comput. Soc., Jun. 19, 2000, pp. 67-74.

"A Process for the Blending of Web Content" Research Disclosure, Kenneth Mason Publications, Hampshire, GB, No. 432, Apr. 2000, pp. 778-779.

Shanmugasundaram J. et al: "Relational databases for quering XML documents: limitations and opportunities" Proceedings of the International Conference on Very Large Data Bases, Sep. 7, 1999, pp. 302-314.

Microsoft FrontPage 2000, Screen Shots, Dec. 31, 1999, pp. 1-20.

Microsoft, "Understanding Absolute and Relative URL Addressing," 2004, pp. 1-2, http://msdn.microsoft.com/library/default.asp?url=/library/en-us/off2000/html/fphowURLs.asp.

Goldfarb, "The XML Handbook—The XML Authority Schema Editor-Free Trial", Second Edition, 2000, Prentice Hall PTR, Upper Saddle River, NJ, US.

Goldfarb, Preface to "The XML Handbook", Second Edition, 2000, Prentice Hall PTR, Upper Saddle River, NJ, US.

* cited by examiner

210 —

| PRODUCTS | | | |
|---|---|---|---|
| KEY | MODEL # | DESCRIPTION | PRICE |
| 1 | 10 - A | BICYCLE | $399 |
| 2 | 12 - L | TRICYCLE | $159 |
| 3 | 16 - Q | UNICYCLE | $209 |
| 4 | 18 - F | TANDEM | $579 |

211 points to row 1; 212, 214, 216, 218 point to columns.

| PARTS | | | | |
|---|---|---|---|---|
| KEY | FKEY | PART # | DESC. | PRICE |
| 1 | 1 | 12 | BICYCLE FRAME | $65 |
| 2 | 1 | 16 | BICYCLE WHEEL | $20 |
| 3 | 1 | 19 | FRONT BRAKE | $18 |
| 4 | 2 | 4 | FRONT WHEEL | $32 |
| 5 | 2 | 13 | SEAT | $50 |
| 6 | 3 | 36 | POST SEAT | $8 |
| 7 | 3 | 17 | TIRE | $20 |
| 8 | 4 | 42 | SEAT | $50 |

221 points to row 1; 222, 224, 226, 228, 229 point to columns.

*FIG. 2B*

```
                    <!? XML>
502 ——— <QUERY URL = "HTTP://"WWW.BIKECO.COM/MLE-CGI/XML?BICYCLEPARTS"/>
504 ——— <RECORD NUMBER = 1>
    506 ——— <KEY>1</KEY>
            <FKEY>1</FKEY>
            <PART#>12</PART#>
            <DESC>BICYCLE FRAME</DESC>
            <PRICE>65</PRICE>
    508 ——— </RECORD>

<RECORD NUMBER = 2>
            <KEY>2</KEY>
            <FKEY>1</FKEY>
            <PART#>16</PART#>
            <DESC>BICYCLE WHEEL</DESC>
            <PRICE>20</PRICE>
            </RECORD>

<RECORD NUMBER = 3>
            <KEY>3</KEY>
            <FKEY>1</FKEY>
            <PART#>19</PART#>
            <DESC>FRONT BRAKE</DESC>
            <PRICE>18</PRICE>
    510 ——— </XML>
```

*FIG. 6*

INVENTORY ORDERING

| SUPPLIER ID | SUPPLIER RECORD # | KEY | SUPPLIER PARTY NUMBER | DESCRIPTION | WHOLESALE PRICE |
|---|---|---|---|---|---|
| CARCO | 17 | 1 | M-17-Z | 15" WHEEL | $17.50 |
| CARCO | 36 | 2 | M-28-Z | 17" WHEEL | $19.50 |
| TRUCKCO | 4 | 3 | QRL5 | 26" DUAL WHEEL | $39.45 |
| CARCO | 83 | 4 | N-14-F | 15" HUBCAP | $7.75 |
| BIKECO | 2 | 5 | 16 | BYCYCLE WHEEL | $20.00 |
| TRUCKCO | 2 | 5 | ENF8 | 33" SPARE TIRE | $53.05 |
| BIKECO | 4 | 7 | 4 | FRONT WHEEL | $32.00 |
| CARCO | 94 | 8 | L-19-F | LIMITED-SERVICE SPARE TIRE | $8.50 |

1400, 1410, 1420, 1430, 1440, 1450, 1460

| URL | SYSDESCR | LAST POLLED | SYS STATUS | KEY |
|---|---|---|---|---|
| HTTP://WWW.CARCO.COM | DATA ABOUT CAR WHEELS AND TIRES. LOCATED IN ST. LOUIS, MO | 11:04.69 2/23/01 | 1 | 1 |
| HTTP://WWW.TRUCKCO.COM | DATA ABOUT TRUCK WHEELS AND TIRES. LOCATED IN GARY, INDIANA | 11:27.33 2/23/01 | 1 | 2 |
| HTTP://WWW.BIKECO.COM | PRIME CONTACT FOR ALL HUMAN-POWERED VEHICLE WHEELS. LOCATED IN IRVINE, CA | 9:47.17 2/23/01 | 2 | 3 |

*FIG. 15*

METHOD AND SYSTEM FOR AUTOMATICALLY DOWNLOADING AND STORING MARKUP LANGUAGE DOCUMENTS INTO A FOLDER BASED DATA STRUCTURE

RELATED APPLICATION INFORMATION

This application is a continuation of U.S. patent application Ser. No. 09/888,329 filed Jun. 22, 2001, titled "Method and System for Providing a Framework for Processing Markup Language Documents" naming Jeff Davison as the sole inventor, now U.S. Pat. No. 8,578,266, which is a continuation-in-part of U.S. patent application Ser. No. 09/882,494 filed Jun. 15, 2001, titled "Web-Based Collaborative Data Collection System" naming Jeff Davison as the sole inventor, now U.S. Pat. No. 7,076,521, which claims priority from U.S. Provisional Patent Application No. 60/214,067 filed Jun. 26, 2000, titled "XML Enabler Agent" naming Jeff Davison as the sole inventor, referred to herein as "the XML Agent provisional application," and which further claims priority from U.S. Provisional Patent Application No. 60/235,458 filed Sep. 26, 2000, titled "Emily XML Portal" and naming Jeff Davison as the sole inventor, referred to herein as "the XML Portal provisional application," all of which are incorporated herein by reference, in their entirety.

BACKGROUND OF THE INVENTION

This invention relates to computer systems, and more particularly to a system for gathering data from a server, and storing and processing the data on the client.

With the rise of the Internet and the World-Wide-Web in modern society, many businesses are now taking their transactional business on-line. These businesses are engaging in business to business ("B2B") on-line transactions with other businesses. B2B refers to a wide variety of information exchanges between different independent organizations. For example, B2B can imply transfer of patient records from one hospital to another, or transfer of pricing data to an independent distributor's point of sales system. B2B can also refer to the transfer of sensitive information, such as financial records between different banks.

The term B2B is often used ambiguously. For example, it is not appropriate to refer to B2B in the context of the internal workings of a company. Although internal workflow within an organization may be similar to a B2B system, transactions within the same organizations are easy to direct, since a governing authority can establish policies and protocols. In contrast, B2B systems have no "boss" that can mandate how transactions occur.

Also, B2B is distinctly different from Business to Consumer ("B2C") exchanges. Although both B2B and B2C share common aspects, B2B is motivated primarily by profitability and competitiveness, whereas B2C includes aspects such as glamour and mass appeal. B2B requires a high degree of standardization, while B2C does not.

The problem associated with B2B is clearly illustrated by electronic purchasing of products by companies. This "e-commerce" model of B2B embodies many of the problems and pitfalls associated with B2B in general. In an e-commerce scenario, a business (the "buyer") purchases items from another business (the "supplier"). The information interchange needed to accomplish an e-commerce transaction includes exchange of electronic product catalogs, generation of purchase orders, and confirmation of product delivery.

Consider an exemplary situation where a large organization wishes to make frequent periodic purchases of products. The products are offered from a variety of vendors, all of which are roughly equivalent. Products are distinguished mainly by the price and delivery schedule of each supplier. To make things complicated, the number of suppliers can be large, and the price and delivery times for products can fluctuate.

This situation is exemplified by many real world organizations, such as State and Federal government agencies, and corporations that use competitive buying practices. In the past, this type of purchasing has required laborious combing of vendor catalogs. Even with diligence, such a system often misses the best price and delivery, and encounters discontinued or sold-out products. It is difficult to keep the list of vendors and products up to date.

B2B e-commerce attempts to correct these deficiencies by using machine-readable electronic product catalogs. These electronic catalogs provide real-time information to e-commerce buying programs. This allows product information such as part numbers, product descriptions, and pricing to be available and automatically updated by suppliers.

The formats of the purchase order and product catalog are potential trouble spots for B2B systems. In most cases, the buyer will require the supplier to present its electronic product catalog in a format that can be used by the buyer's client software. This is important when there is more than one supplier, because the client program must compare pricing, delivery, and other parameters between the various suppliers. Also, the buyer will require that the supplier recognizes, and correctly process, purchase orders generated by the buyer's client program. Thus, the overriding difficulty of implementing the B2B e-commerce system is the issue of product catalog and purchase order compatibility. Specifically, the problem lies in obtaining consensus of format and protocol among many dissimilar and autonomous organizations.

It is not workable to impose standards on the B2B process (such as standard catalogs and purchase orders) that radically affect the internal workings of participating organizations. B2B e-commerce systems will work only if they can be inexpensively layered upon the private policies of a company. Any B2B system that attempts to make drastic changes in the internal workings of the organization runs a high risk of being rejected for the simple reason that participants view their carefully crafted internal systems as part of their "competitive edge." Furthermore, although buyers may want e-commerce, suppliers will resist it in the absence of any mandating authority until the cost of e-commerce is compensatory.

SUMMARY OF THE INVENTION

The present invention is directed to a system for gathering data from a web-based server, transmitting the data to a web-based client, and storing the data on the web-based client.

In an aspect of an embodiment of the invention, an enabler agent translates data from a first data model to a second data model using a data mapping function.

In another aspect of an embodiment of the invention, an enabler agent determines which data mapping function to apply by referencing source-identifying information contained within a data request.

In another aspect of an embodiment of the invention, an enabler agent converts data from a structured data format to a markup language format.

In another aspect of an embodiment of the invention, an enabler agent is entirely web-based.

In another aspect of an embodiment of the invention, a data collector periodically polls a list of URLs to obtain updated data from data servers pointed to by the URLs.

In another aspect of an embodiment of the invention, a data collector accesses data stored on a data server using a predefined query stored on the server.

In another aspect of an embodiment of the invention, a data collector is entirely web-based.

In another aspect of an embodiment of the invention, a data collector converts data from a markup language format to a structured data format.

In another aspect of an embodiment of the invention, a data collector is a modular component, by using a second enabler agent to access a database associated with a data collector

BRIEF DESCRIPTION OF THE DRAWINGS

The accompanying drawings are included to provide a further understanding of the invention and, together with the detailed description, serve to explain the principles of the invention.

FIGS. 2A-2B represent an exemplary data model for a data supplier.

FIG. 6 is a flowchart of a second method for providing data to a data collector, in accordance with an embodiment of the invention.

FIG. 15 is an exemplary URL table, in accordance with an embodiment of the invention.

DETAILED DESCRIPTION OF THE PREFERRED EMBODIMENTS

Before discussing the details of the preferred embodiments, it is useful to provide a brief background on an emerging standard called XML (Extensible Markup Language). XML is similar to HTML (Hypertext Markup Language), which is the language that web pages are written in. However, XML is more flexible than HTML with regard to how tags are named, and how data content can be constructed. Like HTML, XML can be pulled from a web site using HTTP (Hypertext Transport Protocol). XML provides a small advantage to HTML in that it is more readable by programs (although slightly less readable by humans). XML has become a hot topic, mainly because it simplifies the construction of programs that pull data from the web. Also, XML is one of the few standards that provide assistance in the construction of B2B systems.

To implement an e-commerce purchasing system, a simple Server/Client architecture can be established that uses HTTP as the communications protocol, and XML as the underlying data format. The two basic components of such a system are an XML server and an XML client.

The XML server resides at a supplier's site, and allows machine-readable product catalogs to be fetched in real-time by an XML client program at a buyer's site. The server program "advertises" products to potential buyers. The server may also have components to enable online buying of products.

The XML client component resides at a buyer's site, and fetches product catalogs from various XML servers on the network. The client program's job is to scan through the list of suppliers, and determine the best price and delivery options advertised. The client may also be responsible for actually performing a purchase of the products via delivery of an electronic purchase order to the supplier.

These two components form the building blocks of the B2B e-commerce model. XML servers provide product catalogs, which are read by XML clients. XML server programs are HTTP servers that provide XML documents rather than HTML documents. XML client programs are programs that read the XML data, similar to the way web browsers read HTML, but with a special graphical user interface.

Figure 1:
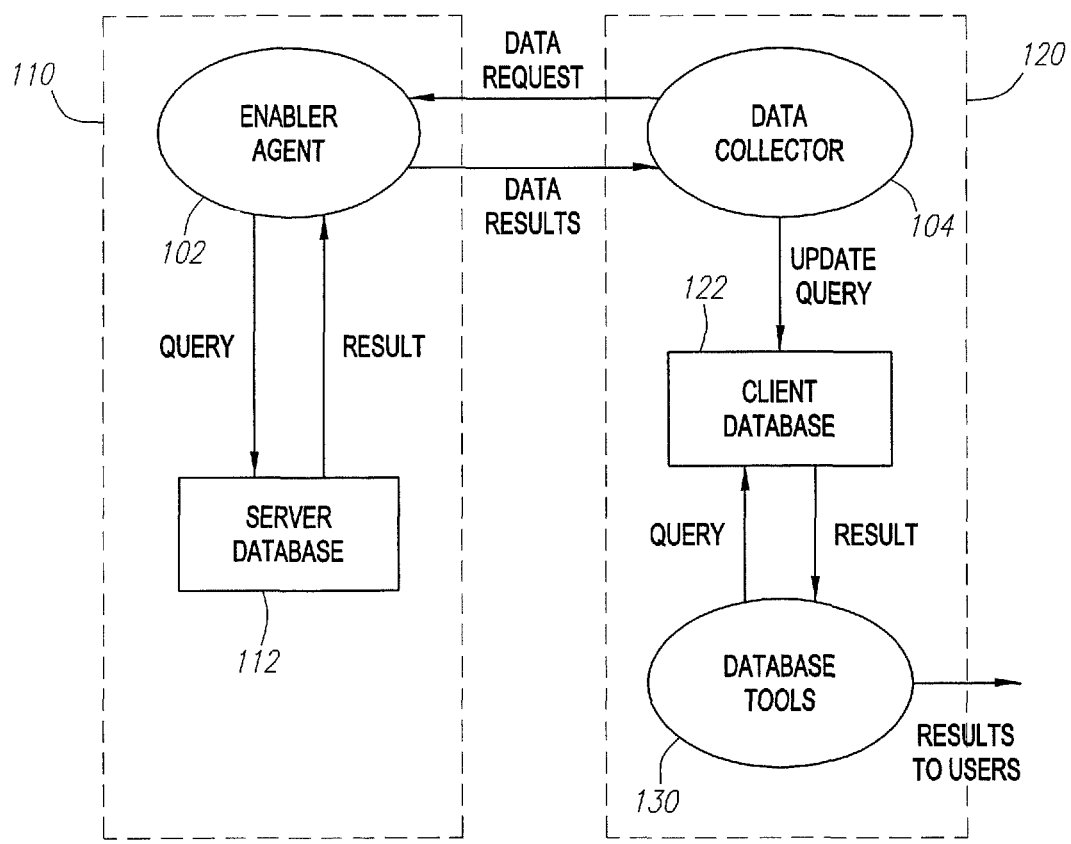
FIG. 1 is a depiction of a client/server relationship in accordance with an embodiment of the invention.

A depiction of the XML server/client relationship is provided in FIG. 1. The supplier's XML server 110 includes a server database 112, which provides electronic product catalog information describing the organization's products, and an enabler agent 102 which processes this data for transmission to the buyer. A data collector 104 on the buyer's XML client 120 receives this information, and stores it in a client database 122. Once the information is received, a database tool 130, such as a purchase order program, on the buyer's client 120 can access the data for various functions, such as initiating purchase orders to the supplier's order processor (not shown).

Although only one XML server and XML client is shown in FIG. 1, each XML client program can have many XML server relationships, and each XML server can have many XML client relationships. Given a situation where the number of buyers is less than the number of suppliers, the number of XML clients for each server will likely be numbered in the hundreds, while the number of XML servers for each client will be numbered in the thousands.

A web-based data communication system in accordance with an embodiment of the invention includes two basic functional units. The first functional unit is an enabler agent 102 that resides on a server, such as the XML server 110 described above. The second functional unit is a data collector 104 that resides on a client, such as the XML client 120 described above. The enabler agent 102 works in tandem with a server database 112, to provide data from the server database in a standard, platform independent format. The data collector 104 works in tandem with a client database 122, to receive data in a standard, platform independent format and store the data in the client database 122. The data communication system works in either a one-to-one, one-to-many, many-to-one or many-to-many environment. Each server communicates data to one or more clients. Each client receives data from one or more servers.

For the sake of simplicity and clarity, this discussion will focus on an implementation of the data collection system in a B2B e-commerce model, as discussed above. The data communication is not limited to e-commerce, however. The system can be generalized to cover many other situations where information needs to be transferred between independent entities. For example, consider how such a system would work in a hospital environment.

The hospital has various enabler agents that furnish access to the databases within the organization. Various specialized clients are provided for specific work groups. The following system might be implemented.

Patient Server. The enabler agent provides patient records for doctors, indicating the current patient health. In general, the enabler agent serves data to those hospital client programs requiring information on patient status.

Doctor Client. The "Doctor Portal" software allows the doctor to place orders for new tests and medication. The orders are similar to purchase orders, however these orders initiate actions by hospital nurses and technicians rather than actions by a supplier's shipping department.

Administrator Client. The "Hospital Administration Portal" allows the patient insurance forms (including tests and medication prescribed by the Doctor) to be submitted to the insurance company.

Insurance Company Server. At each of the various insurance companies used by the hospital and patients, the enabler agent provides insurance information for the hospital, for use by the Administrator Client. This allows the administrator to inspect insurance data and submit insurance claims on line.

The only major changes to the B2B model are in the particular data catalogs (which refer to patients rather than products), and the types of orders initiated by the system (which refer to medical tests and prescriptions rather than purchases.) Otherwise, the system functions much as the B2B e-commerce system described in preceding sections.

Enabler Agent.

Referring to FIG. 1, the first component of the data collection system is the enabler agent 102. The enabler agent 102 runs on the server 110, which is controlled by the data supplier. The enabler agent 102 is a web-based application that works in tandem with the server database 112. The server database 112 is a database under the control of the data supplier. The server database 112 stores data in a particular data storage format. Exemplary data storage formats include SQL, flat files of varying format, CORBA databases, XML documents, and HTML documents. In addition to being stored in a particular data storage format, the data is stored in accordance with a particular data model. The details of the data model are determined by the needs and desires of the data supplier, and are not critical to the invention.

FIGS. 2A-2B are an example of how a particular data supplier, in this case a manufacturer of bicycles, would model their data describing bicycle parts. The data model includes a products table 210 and a parts table 220. The data contained within the products table 210 includes a list of all of the fully assembled products that the bicycle manufacturer sells. The products table 210 includes a series of product records 211, which store the data for each product the bicycle manufacturer sells. The products table 210 contains a products key field 212, which uniquely identifies each record in the table. The products key field 212 is used internally to associate the products table 210 with other tables within the server database. The products table 210 also includes a model number field 214, a description field 216, and a price field 218, which contain the various data items which describe each product record in the products table 210.

The data contained within the parts table 220 includes a list of all of the various parts the bicycle manufacturer sells. The parts table 220 includes a series of parts record 221, which store the data for each part the bicycle manufacturer sells. The parts table 220 has a parts key field 222, which uniquely identifies each record in the parts table 220. The parts key field 222 is used internally to associate the parts table 220 with other tables within the server database. The parts table 220 also includes a foreign key field 224, which refers back to the products key field 212 of the products table 210. This field links each parts record 221 in the parts table 220 with a product record 211 in the products table 210. The rest of the parts table 220 comprises a part number field 226, a part description field 228, and a price field 229, each of which contain data describing each part record 221 in the parts table 220.

Returning to FIG. 1, the enabler agent 102 retrieves data from the server database 112 in response to a data request from a user. The user may be a human being, or the user may be a computer process controlled by a human being, or the user may be an automated computer process. In a preferred embodiment, the user is the data collector 104 residing on the client 120.

The request contains information that identifies the data to be retrieved. The request can be transmitted in a variety of ways. In a preferred embodiment, the request is a URL transmitted from the data collector 104. In an alternate embodiment, the request is an electronic mail message. In another alternate embodiment, the request is an application-specific message transmitted by the data collector 104 or by another computer process.

In a preferred embodiment, the request comprises information that identifies a pre-generated database query, the query being stored on the server 110. An exemplary request comprises a URL taking the following form:

http://(hostspec)/mle-cgi/xml?(queryname)

In this URL, (hostspec) is a value that identifies the particular server that the request is directed to. An exemplary (hostspec) value is www.supplier.com. The portion of the URL between the (hostspec) and the (queryname) is information that identifies a particular location on the server where the pre-generated database queries are stored. This information points to, for example, a file or directory containing the pre-generated query.

In this URL, (queryname) is a value that uniquely identifies the particular database query that the request seeks to invoke. The (queryname) value is an arbitrary identifier or keyword that is mapped to a query stored on the server. An exemplary mapping scheme comprises storing each query in a separate file, and referencing the query in the URL by providing the name the file it is stored in the (queryname) section of the URL. For example, the bicycle manufacturer data model discussed above would have queries named "PartsByPrice", which retrieves the entire parts table sorted by price, and "BicycleParts", which retrieves all records in the parts table that correspond to parts used in bicycles.

In this embodiment, an administrator pre-generates a set of database queries and stores those queries on the server. The administrator can use a variety of ways to create these queries. The administrator can manually write the queries. The administrator can also use a query design tool to generate the query in the query language, from a higher level model. The query design tool may be a component associated with the particular database software used to create the server database, or it may be a third-party or stand-alone package. In a preferred embodiment, the administrator uses a web-based editor accompanying the enabler agent software to create the queries.

Once the queries are created, they are stored on the server. In a preferred embodiment, the queries are stored in separate files on the server. This allows the enabler agent to locate the proper query quickly and easily, when the enabler agent is presented with a URL containing the keyword associated with the query, as discussed above. Queries can also be stored in other formats; for example, a single file could contain a library of related queries. The enabler agent in this example would parse the library file to locate the particular query specified in the request.

Figure 3:
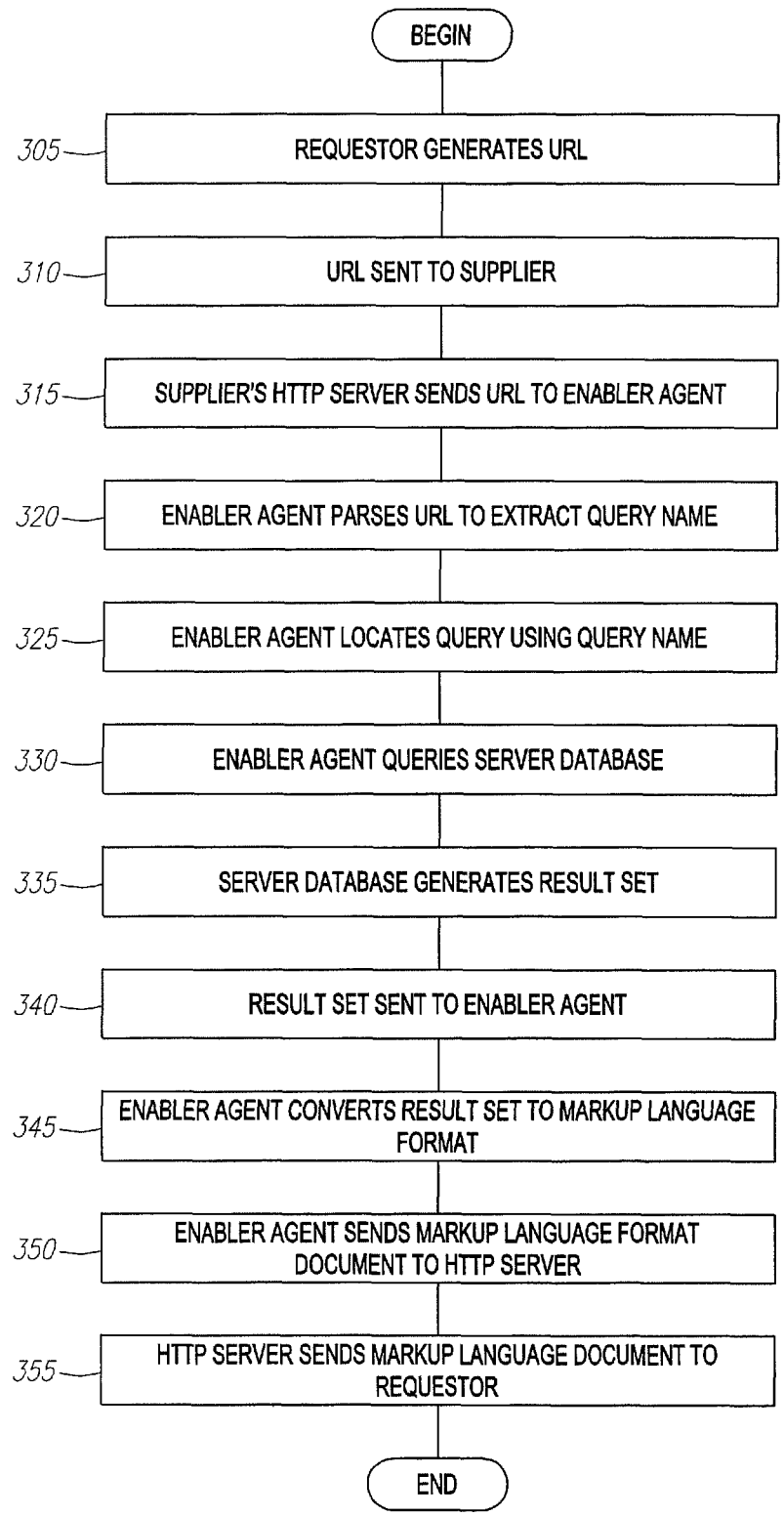
FIG. 3 is a flowchart of a first method for providing data to a data collector, in accordance with an embodiment of the invention.

Turning to FIG. 3, a method for providing data to a data collector in response to a pre-defined query begins at step 305, with a data requester generating an URL. An HTTP server on the requestor's machine routes the URL over the network to the supplier's server, at step 310. The supplier's HTTP server determines, based upon information contained in the URL, that the URL is a request for the enabler agent, and the URL is routed to the enabler agent at step 315. This routing is a function of the HTTP server, which maps URLs to specific disk files and directories on the server platform. For example, the Apache HTTP server uses an "Alias" directory in the Apache configuration file. The enabler agent parses the URL, at step 320, to extract the query identifier. Using this query identifier, at step 325 the enabler agent locates the query associated with the query identifier, the query being stored on the supplier's server. At step 330, the enabler agent queries the database using the query identified above. The server database generates a result set based on the contents of the query, at step 335. This result set comprises the rows from the various tables of the server database that correspond to the parameters of the query.

The result set is sent back form the server database to the enabler agent, at step 340. At this stage, the result set is still represented in the structured data storage format used by the server database. The enabler agent converts the structured data storage formatted data into markup language data at step 345, and creates a markup language formatted document. The enabler agent then sends this document to the HTTP server at the supplier's site, at step 350. Finally, the supplier's HTTP server routes the markup language document to the requestor, at step 355.

In another preferred embodiment, the request comprises a database query generated at the time of the request. An exemplary request in accordance with this embodiment is the following URL:

http://(hostspec)/mle-cgi/xml?post

In the above URL, (hostspec) is defined as discussed above. The URL is one way of sending a request to the HTTP server, using an HTTP POST command. This allows arguments contained in an HTML document (using HTML <INPUT> directives) to be sent to the enabler agent. The <INPUT> directive is a standard component of HTML, which allows input by forms to an HTTP server. In an embodiment, the <INPUT> command contains a SQL query, or some other way of directly specifying a request for data, the data to be converted to an XML document. In an alternate embodiment, the arguments are sent to the enabler agent by incorporating them as part of a second URL. For example:

http://(hostspec)/mle-cgi/xml?post?(sqlstatement)

The server uses this additional information to ensure that the query is run properly, and that the requesting user has permission to access the server database. If this information is not provided, the request is processed using default values configured by the administrator of the enabler agent. The administrator may configure the enabler agent using the web-based interface discussed below, or the administrator may manually edit a configuration file.

Figure 4:
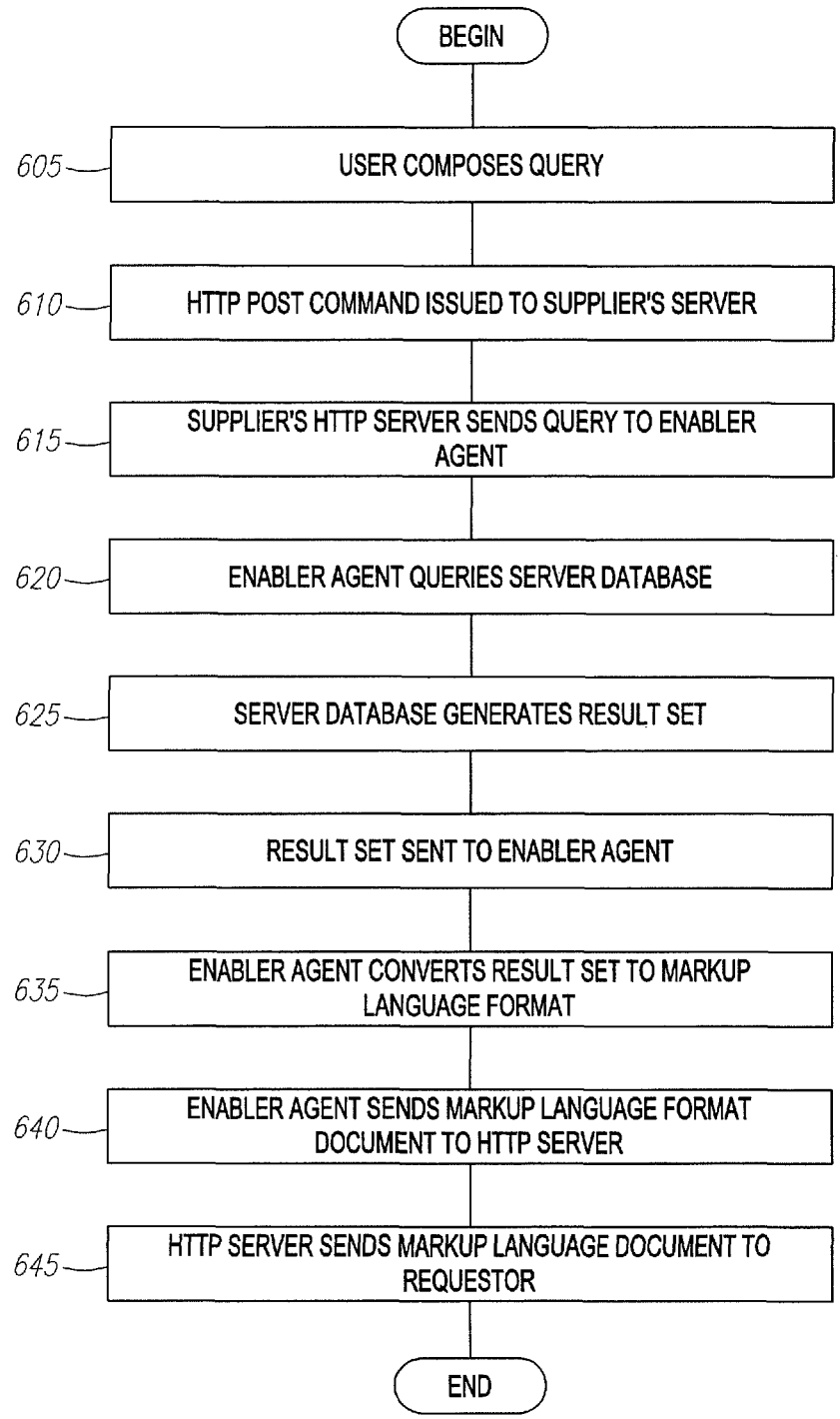
FIG. 4 is a flowchart of a method of converting data from a structured data storage format to a markup language format, in accordance with an embodiment of the invention.

Turning to FIG. 4, a method for retrieving data from a server in response to a user-generated query begins at step 605, with a data requestor composing a query. The query is then submitted to the supplier's HTTP server by sending an HTTP "post" command to the server, at step 610. The post command contains the query and any additional parameters necessary to process the query, such as a user name or a password. The supplier's HTTP server parses the URL and routes the post command to the enabler agent, at step 615. The enabler agent executes a CGI script that extracts the query from the incoming URL, and sends the query to the supplier's database, at step 620. The server database generates a result set based on the contents of the query, at step 625. This result set comprises the rows from the various tables of the server database that correspond to the parameters of the query.

The result set is sent back form the server database to the enabler agent, at step 630. At this stage, the result set is still represented in the structured data storage format used by the server database. The enabler agent converts the structured data storage formatted data into markup language data at step 635, and creates a markup language formatted document. The enabler agent then sends this document to the HTTP server at the supplier's site, at step 640. Finally, the supplier's HTTP server routes the markup language document to the requester, at step 645.

Figure 5:
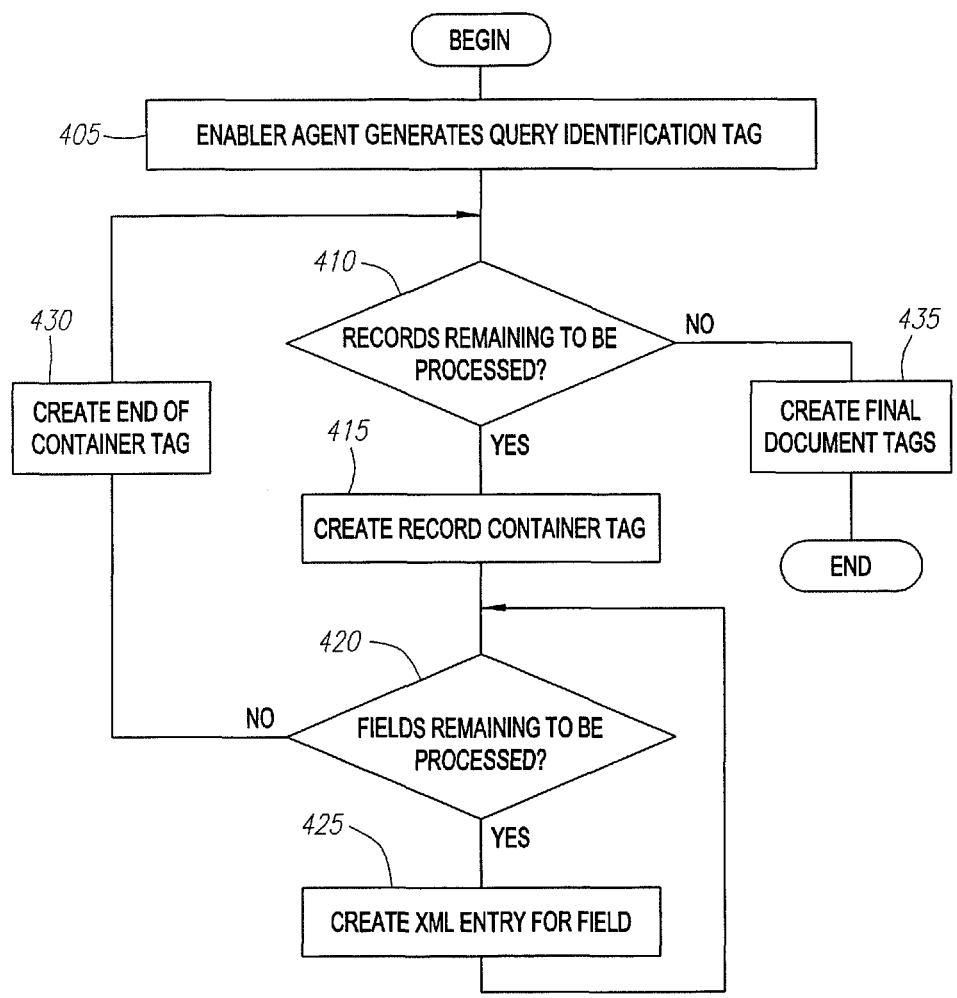
FIG. 5 is an exemplary XML data document constructed using the method of FIG. 4.

In an embodiment where the markup language format is XML, the enabler agent converts the structured data formatted data to XML format using the method of FIG. 5. An exemplary XML document generated by applying this method to a query of the database shown in FIGS. 2A-2B is shown in FIG. 6. The enabler agent receives the result set from the server database, and generates a query identifier tag at step 405. An exemplary query identifier tag 502 is shown for the query "BicycleParts" discussed above. At step 410, the enabler agent examines the result set and obtains the next database record to be processed.

Assuming that records remain to be processed, the enabler agent selects the next record to process, and creates a record container tag for the record, at step 415. The record container tag is assigned a value that uniquely identifies which record of the client database is contained in the query. An exemplary record container tag 504 is shown for the first record in the result set generated by the "BicycleParts" query discussed above. The record container tag 504 has a value of one (1), which corresponds to the value of the key field 222 of the record, as shown in FIGS. 2A-2B.

The enabler agent then parses the fields of the record being processed, at step 420. Assuming that fields remain to be processed, the enabler agent selects the next field to process, and creates a field entry tag for the field, at step 425. By default, the field entry tag is given the name of the corresponding table column matched by the specified query. An administrator using a web-based setup screen can override these default tag names, and the administrator can assign different names. The field value is inserted into the field entry tag, and the field entry tag is then closed. An exemplary field entry tag 506 is shown for the "Key" field of the first record in the result set generated by the "BicycleParts" query discussed above. The field entry tag 506 has a value of one (1), corresponding to the value of the key column 222 of the first record of the parts table 220, as shown in FIGS. 2A-2B.

Once the field entry tag is closed, control passes back to step 420, where the next field is processed. Once all the fields of the first record of the result set have been processed, the enabler agent creates an end of record container tag, at step 340. An exemplary end of record container tag 508 is shown for the first record of the result set for the query "BicycleParts" discussed above. Control then returns to step 410, for processing of the next record in the result set. Once all records in the result set have been processed, at step 435 the final XML tags are created and the XML document is closed. An exemplary closing tag 510 is shown for the result set of the "BicycleParts" query discussed above. Optionally, a data type diagram is also generated for the result set. This data type diagram specifies the type of data being stored in each field of the records of the result set. Table 1 shows an exemplary data type diagram for the "BicycleParts" query.

TABLE 1

| Field Name | Data Type |
|---|---|
| Key | INTEGER |
| Fkey | INTEGER |
| Part # | PCDATA |
| Desc. | PCDATA |
| Price | DOLLAR/NUMERIC |

Using this conversion method, a valid and well-formed XML document is constructed directly from a combination of the field names of the database and configuration data set up by the administrator.

The enabler agent also contains a collection of utility programs to facilitate the setup, operation and debugging of the data collection system. Exemplary utility programs include: a query viewer, to display the results of a query in HTML format; a query editor, to assist an administrator in constructing the pre-defined queries discussed above; a database parameter editor, to allow the user to configure the basic login parameters of the enabler agent, such as the default server name of the server containing the server database, the default login name to supply to a user-generated query, the default password to supply to a user-generated query, and other such parameters; a security parameter program, to assist the administrator in configuring the security parameters of the enabler agent, such as a list of trusted hosts, an authentication mechanism to be used in verifying the identity of users, and a list of the allowed operating modes of the system, which specify whether the enabler agent will accept either predefined queries, user-defined queries, or both; and a tag browser program, which provides a simple web-based XML and HTML client that can be used to test the operation of the enabler agent. This list of utility programs is exemplary and not exclusive. Other utility programs can be provided, depending on the particular implementation parameters of a particular embodiment.

Figure 7:
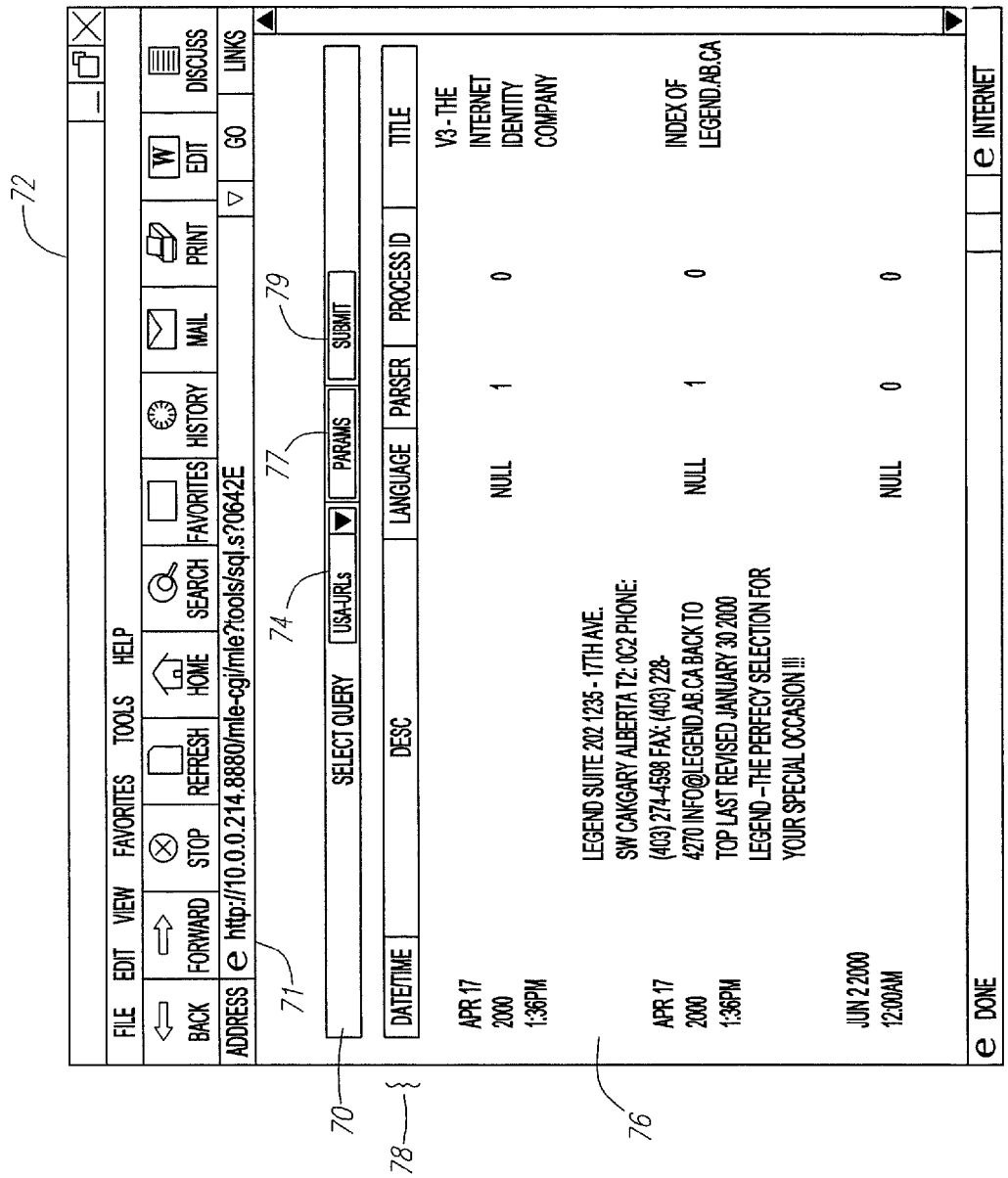
FIG. 7 is a depiction of a query viewer screen, in accordance with an embodiment of the invention.

Turning to FIG. 7, a query viewer screen 70 in accordance with an embodiment of the enabler agent is implemented as a web-based CGI script. The query viewer screen 70 is displayed by activating a first URL 71, inside a web browser program 72. The query viewer screen 70 allows the user to select a particular query to be viewed in HTML format. The screen shows the queried data in a tabular format, and allows the user to select the particular query via a pull-down menu 74. The various queries available to the user are provided in the pull-down menu 74. Queries are constructed via the query editor tool shown in FIG. 8.

The query viewer screen 70 provides a simple way to obtain visibility into a system for debug and analysis purposes. The table 76 displayed by this screen is automatically created from the results of the query. The table 76 is generated from the query results by parsing the query results into components that are formatted into an HTML document that is returned to the user. The top of the table 76 indicates the various fields 78 specified in the query, which also corresponds to the various markup language format tags read by the data collector.

The query viewer screen 70, in addition to providing a view of queried information, also provides the user with a list of the various queries created by the query editor screen from the pull-down menu 74. Additionally, database parameters are configurable for the query by activating a button 77 that calls up a query parameter screen. A button 79, when activated, submits the query to the database.

A user of the query viewer screen 70 views a particular query by: (1) selecting the query from the pull-down menu 74, (2) providing any required database parameters by activating the button 77 and entering the values into the form that pops up, and then (3) activating the button 79, thus submitting the query to the database. The query results are returned, automatically converted into HTML format, and displayed in the query viewer screen 70.

Figure 8:
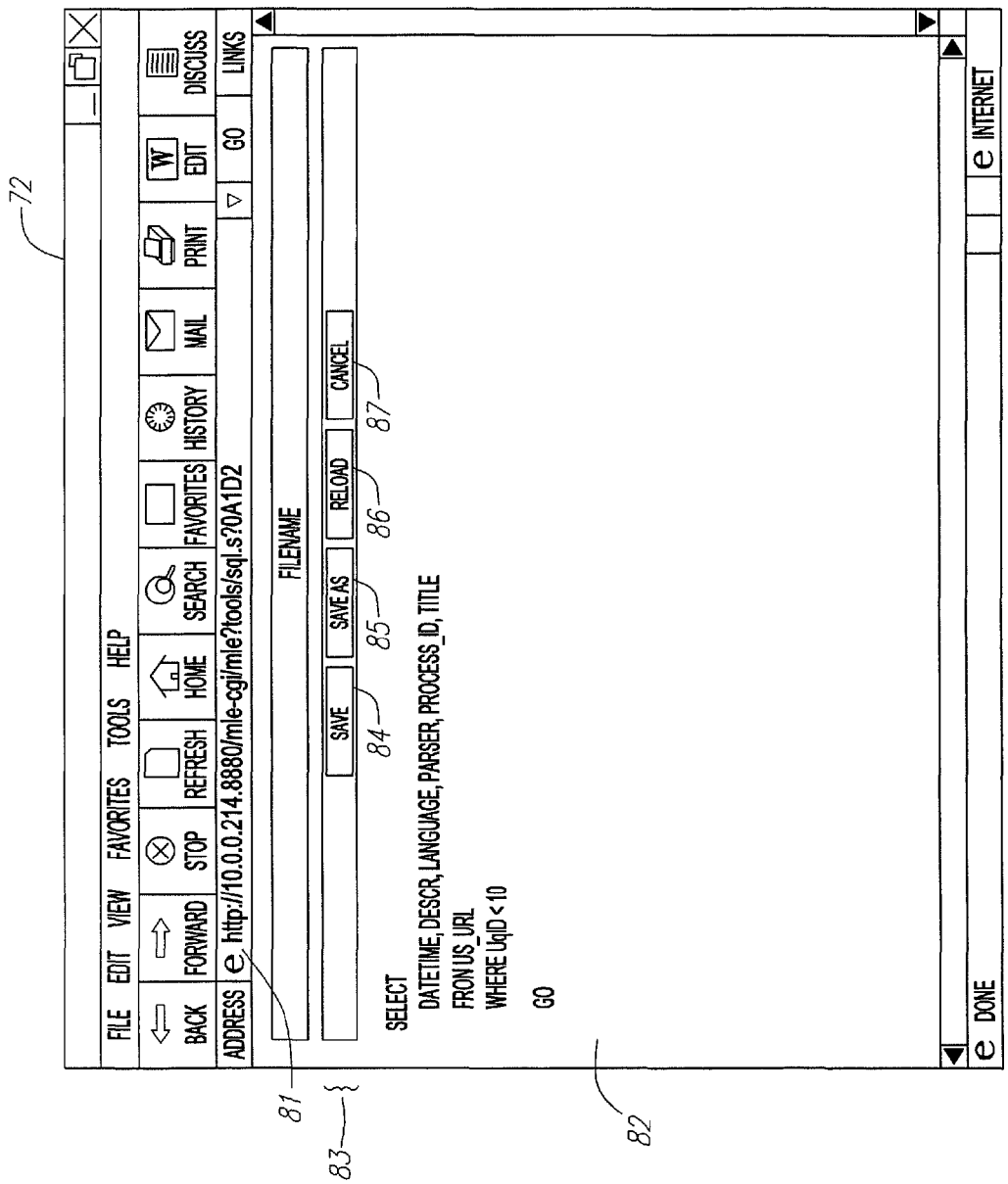
FIG. 8 is a depiction of a query editor screen, in accordance with an embodiment of the invention.

Turning to FIG. 8, a query editor screen 80 in accordance with an embodiment of the enabler agent is implemented as a web-based CGI script. The query editor screen 80 is displayed inside the web browser 72, by activating a second URL 81. The query editor screen 80 allows the user to compose queries that are associated with particular items in the pull-down menu 74 of the query viewer screen 70 (of FIG. 7). The query editor screen 80 allows the user to create, modify, or delete queries, and associate these queries with items in the pull-down menu 74 of the query viewer screen 70 (of FIG. 7).

The query editor screen 80 contains a text window 82 where the user can enter the query, in a structured data storage format, such as SQL. The query editor screen 80 also contains a palette of buttons 83 that provide functionality to the screen 80. These buttons include; a save button 84, which when activated cause the contents of the text window 82 to be saved to long-term storage; a save as button 85, which when activated causes the user to be prompted to enter an identifier to be associated with the contents of the text window 82, and then saves the contents into long-term storage; a reload button 86, which when activated causes the user to be prompted for a query identifier, and then retrieves the query associated with the query identifier and displays it on the text window 82; and finally a cancel button 87, which when cancels any operation in progress. For example, if the user activates a long query, and then wishes to halt operation of the query, the user clicks the cancel button 87. These are exemplary members of the button palette 83. Depending upon the particular functionality desired, other buttons could be included in the button palette 83.

The query editor screen 80 facilitates associations of queries (which are not visible to clients or unprivileged users) and the query results. Each query resides in its own file on the server. The files can be modified by the query editor screen 80, or by a standard text file editor.

Figure 9:
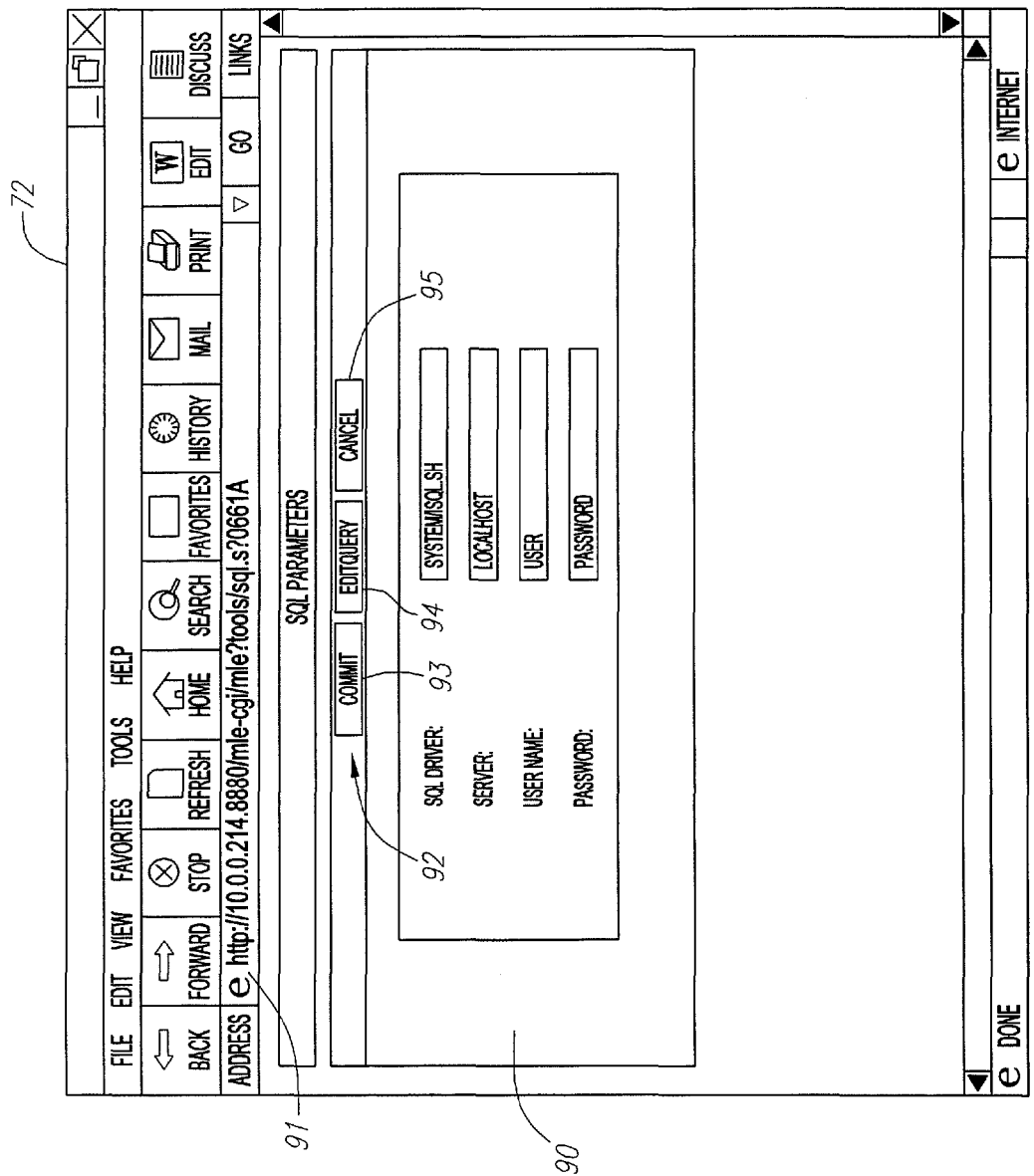
FIG. 9 is a depiction of a parameter editor screen, in accordance with an embodiment of the invention.

Turning to FIG. 9, a database parameter screen 90 in accordance with an embodiment of the enabler agent is implemented as a web-based CGI script. The database parameter screen 90 is displayed inside the web browser 72, by activating a third URL 91. The database parameter screen 90 provides general utility in configuring the various parameters of the system. This screen provides a central place for specifying values needed to make queries, such as driver programs, time-outs, passwords, and security items. This screen also allows easy modification of an existing mapping of a query to a data source. This screen will typically be available to privileged users.

The database parameter screen 90 has text boxes 92, where a user enters the necessary parameters for the database. The particular parameters to be used are dependent upon the specific database package chosen by the creator of the data collection system.

The database parameter screen 90 also has a button palette 92, which provides functionality to the screen. These buttons include: a commit button 93 that when activated causes the changes made by the user to be stored to the database; an edit query button 94 that when activated pops up a window containing the query, and allowing the query to be edited; and a cancel button 95 that when activated closes the database parameter screen 90 without making any changes. These are exemplary members of the button palette 92. Other buttons can be used in the button palette 92, depending on the particular functionality desired.

The enabler agent is intended to be a comprehensive system containing various support tools and facilities. Exemplary support tools include: an embedded HTTP server, to allow users to run the enabler agent without needing a third-party HTTP server; database insert and update utilities, which allow privileged users to insert and update tables on the server database and provide a programmatic interface to allow a table to be loaded by external software, such as the Emily Framework language discussed below, or an HTTP client; the Emily Framework scripting language and development kit, to allow users to create new functionality and capabilities for the system; and online documentation in the form of markup language documents and PDF files, the documentation being sufficient to install, configure, operate and maintain the system.

Emily Framework Scripting Language

Figure 12:
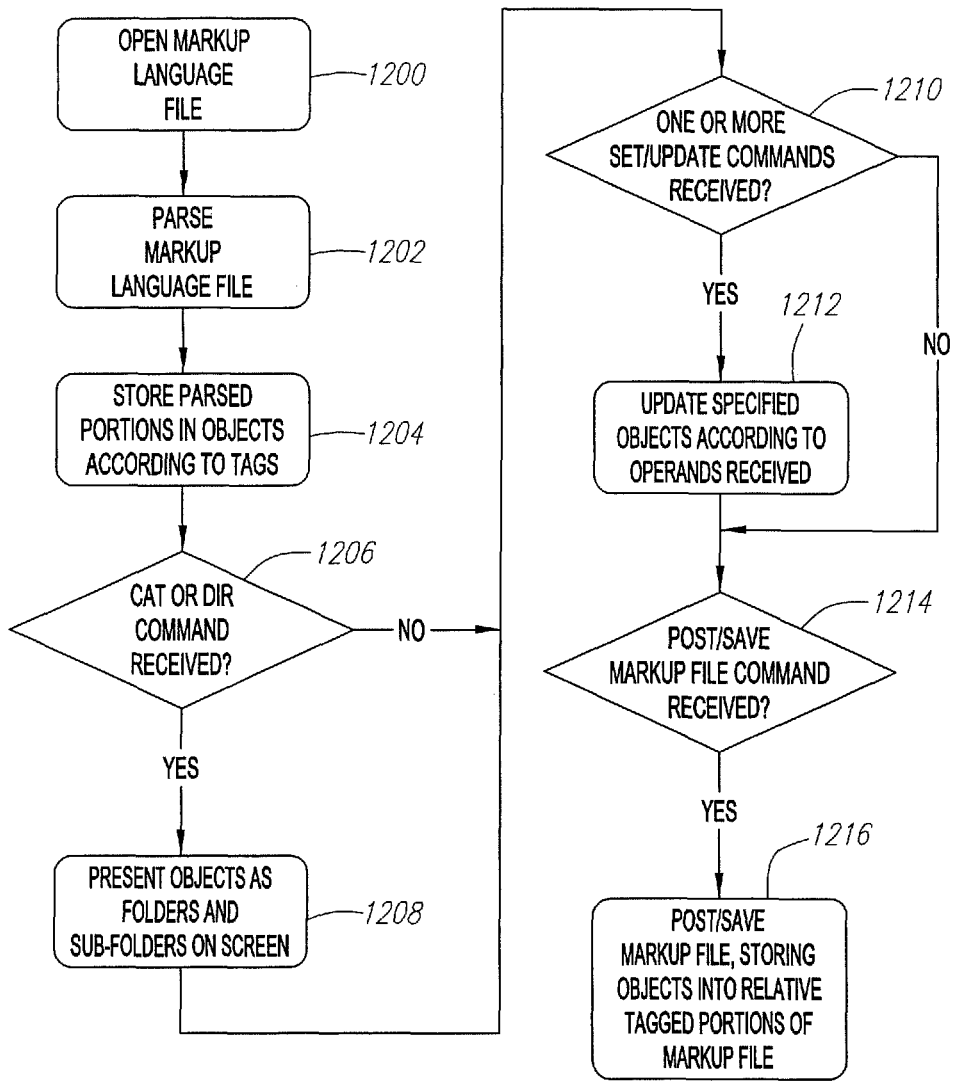
FIG. 12 is a flowchart of a method of parsing data using the Emily Scripting Language of the invention.

With reference to FIG. 12, a flow diagram illustrating a typical method performed by the Emily scripting language is shown. The Emily scripting language may be used for processing a markup language file having one or more tagged portions. The method comprises opening a first markup language file, step 1200, and parsing the first markup language file for one or more portions, step 1210. The language interpreter then stores each portion of the first markup language file into one or more objects in an electronic memory, at step 1202.

Part of the Emily language may include a CAT or DIR command. If such a command is received by the language interpreter, step 1206, then the interpreter causes the one or more objects to be presented for selection, viewing or other processing in one more corresponding folders and sub-folders on-screen, step 1208. The one or more folders may be presented in a hierarchical list having sub-folders according to an arrangement of sub-portions of the first markup language file, each sub-folder representing an arrangement, sub-arrangement, or object containing a portion of the first markup language file.

The Emily language comprises a command language set allowing selection, viewing and other processing of the one or more objects. The command language set comprises a plurality of commands for selection, viewing and other processing. A subset of commands may comprise one or more commands for processing one or more folders, subfolders, portions, or sub-portions of the first markup language file, the subset comprising one or more executable batch files containing a subset of the set of commands. One or more executable batch files may be included within a second markup language file, the subset of commands in the executable batch file comprising commands for including one or more of the objects containing portions of the first markup language file in the second markup language file.

The language interpreter may receive one or more SET or UPDATE commands for setting or updating objects in the first or second markup language file, step 1210. If such a command is received, the language interpreter updates the objects in memory according to the commands received, step 1212.

If a POST or SAVE command is received, step 1214, the following steps may be performed as part of said other processing for updating the respective markup language file, step 1216: receiving a subset of commands comprising one or more commands, said one or more commands comprising instructions for updating one or more objects based on the received one or more commands; updating the one or more portions contained in the one or more objects according to the received one or more commands; and saving the portions contained within the one or more objects to the first respective language file that have been updated.

Alternatively, the following steps may be performed as part of said other processing for providing a second markup language file to a network node identified by a uniform resource locator: receiving a subset of commands comprising one or more commands, said one or more commands comprising instructions for updating one or more objects based on the received one or more commands; updating the one or more portions contained in the one or more objects according to the received one or more commands; and providing the second markup language file to the network node identified by the uniform resource locator.

Alternatively, the first markup language file may comprise one or more portions receptive to data input, wherein said other processing comprises receiving and sending said data input by performing the steps of: receiving said data input, storing said data input into in said objects containing said one or more portions receptive to data input; and posting said data input to said markup language file. At least a portion of the data input may then be processed after the step of receiving and before the step of storing. This alternative processing may be used, for example, to receive SQL commands for performing a query on a remote database, or posting to a remote database.

The method of parsing and presenting a markup language document to a local computer system is divided into two phases: a first download phase where a markup language document is copied from a web server or local file system, followed by a second analysis phase where the markup language document, once downloaded, is parsed and presented to the local computer system as a linked list for further manipulation of the document objects. This first phase begins and ends where phase two of the markup language parser and presenter module begins. Phase two begins where the markup language parser and presenter module maps each document object to a virtual root, branch, or leaf object in the memory space of the local computer.

A markup language parser and presenter module is invoked using a single command whose syntax resembles a typical command-line processor. For example, the functionality of the markup language parser and presenter module may be implemented by the following statement:

open http://www.vcsy.com where the URL is supplied as an argument to the "open" command.

In one embodiment of the markup language parser and presenter module, the markup language document source is the hypertext transport protocol (HTTP), meaning the download is accomplished using HTTP to reference the markup language document by its assigned URL (uniform resource locator) on the network. The markup language parser and presenter module contemplates the processing of local documents as well. A local document resides on the local computer system where the markup language parser and presenter module is executing. Thus, another embodiment of the markup language parser and presenter module anticipates the processing of documents on the local system using the name of the local file. Local document processing neither requires that the document be copied from a web server using HTTP nor that the document be referenced by a URL. In this case, the "open" syntax would instead require a valid local file pathname to be supplied, as in:

open "c:\DOCS\resume.htm"

or, open "/usr/data/resume.htm".

The markup language parser and presenter module parses the command line. The markup language parser and presenter module decides whether the markup language document source is HTTP. If the source document is not an HTTP document phase two analysis continues. If the source markup language document is an HTTP document, then processing resumes. If the HTTP request status indicates that a redirect is required, the markup language parser and presenter module will derive the new URL to the document and begin the download phase over again. If the markup language parser and presenter module determines that no redirection is required, processing continues. An error produced by the HTTP request will cause the markup language parser and presenter module to abort. Examples of HTTP errors include 404, URL not found, etc. Once the user identifies a viable URL, processing of the markup language parser and presenter module may resume again, but only after the user reexecutes the module. If no error is produced by the HTTP request, processing continues. The markup language parser and presenter module determines if the source document is an HTML document. If the source markup language document is an HTML document, every relative URL gets converted to an absolute URL before the document is delivered to the analysis phase.

The analysis phase of the markup language parser and presenter module begins. The goal of the analysis phase is to create a virtual data structure for presentation to the functional modules of the framework for processing markup documents and to the host processing system. A preferred embodiment contemplates the use of a linked list data structure to accomplish the presentation.

A linked list is a type of dynamic data structure that uses pointers to "chain" data elements of the list together. The data elements of the list are called nodes. Linked lists may be either linear, in which case each node contains pointers only to one neighboring node in a serial fashion. Thus in order to traverse the linear list of data elements, one must pass through every data element of the list as though climbing a ladder, rung by rung.

The tree structure is a type of linked list wherein the nodes are arranged in hierarchical fashion and includes a root node. The tree analogy used to describe this type of linked list further extends to branch and leaf nodes. A linked list looks like an inverted tree. Notably, leaf nodes do not contain pointers to other nodes and the root object, of which every tree has only one, is not pointed to by any other nodes.

A preferred embodiment of the markup language parser and presenter contemplates the one-to-one mapping or "presentation" of a markup document to the other modules of the framework as a tree wherein the nodes are the objects of the source markup document. The resultant tree will have as its leaf objects, the tags and attributes of the source markup document and will have as its branch objects, only those tags of the source markup document that contain either attributes, other tags, or both attributes and tags. Finally, the root object of the tree will contain pointers to other branch objects or leaf objects, although the latter is rare. The root object will frequently derive from the first tag in the markup document that specifies the markup language by which the document was written. In one embodiment, the markup language is the hypertext markup language (HTML); in another, the extensible markup language (XML), although other such markup languages are within the scope of the framework.

A parsed markup document may be derived from HTML format into to hierarchical levels of nodes. Node level 0 represents the root node of the tree. The root node is derived from the <HTML> tag. Similarly, the HEAD branch object of node level 1 is derived from the <HEAD> tag. The hierarchical arrangement of the tree closely mirrors the hierarchical arrangement of tags in an HTML document. The closing tag element <HTML> for the HTML tag.

Rules are followed by the markup language parser and presenter module when mapping markup language documents to resultant root, branch, or leaf objects in building the virtual directory tree presentation. These rules further ensure that no two document objects map to the same directory tree object in the resultant linked list. In other words, the resultant linked list node objects must uniquely identify each respective markup language parser and presenter module document object. This is because markup language documents frequently contain multiple instances of the same tag. It is possible, therefore, for a tag or subtag to contain more than one subtag of the same name. Attributes, conversely, are always assured uniqueness because a given document tag can never have a multivalued attribute. One rule is that same-name subtags of different tags maintain uniqueness by employing instance numbers if needed. Consequently, a tag when mapped to the directory tree is embodied as a leaf object whose name includes the unique instance number associated with the sequential occurrence of that tag in the markup language document. Attribute document objects carry a similar uniqueness requirement. Attribute document objects that become named leaf objects when mapped to the directory tree satisfy uniqueness by virtue of their associated with an instance leaf object tag name.

The foregoing method of parsing and presenting a markup document lays the foundation for further processing by subsequent modules of the markup language document processing framework.

The second module of the method and system for providing a framework for processing markup language documents is the markup language command processor. One group of commands that form part of the markup language command processor is the access command group, so called because the commands in this group perform no actions which alter the physical structure of the tree in memory. A second group of related commands designed to alter the tree structure shall be described hereafter.

The markup language parser and presenter module parses and opens a document before the command processor is invoked. If a markup language parser and presenter module document has not successfully been presented using the markup language parser and presenter module technique described above, the markup language command processor method may suspend activity in one embodiment, awaiting the building of a viable tree structure in memory. If the markup language command processor encounters a viable tree structure in memory, the markup language command processor acts as an interpreter, processing user input from a command line much like the command processor kernel of a text-based, operating system like Unix.

In one embodiment, the markup language command processor has an ability to parse wildcard characters, redirect symbols, filters, and other command line features prevalent in modern command processing systems that enhance processing and permit greater user flexibility. One noteworthy feature is variable indirection, familiar to those skilled in the art of computer programming control structures that cycle, loop, or otherwise iteratively process command instructions. Familiar to programmers are the DO-NEXT, FOR-WHILE, and REPEAT-UNTIL control structures, all of which depend on index variables to control processing and provide process termination. Here, for example, a programmer-user may desire to display the contents of a singular table element of an HTML document. An example of a command line (variable indirection) that accomplished this might look like the following:

echo $html/body/$table:$i/tr:$j/td:$k"

To determine if variable indirection is required, the command processor must parse the command line looking for tag names employing instance values. In this instance, the user wishes the command processor to "echo", that is, display on the standard output device (usually the monitor) the contents of the "$kth" column of the "$jth" row of the "$ith" table in the body of a presented HTML document. Of course, some of iterative control structure must control recursive substitution of the variables (acting as index variables) with valid instance values. Thus, after substitution the command line may look like:

echo $html/body/Table:2/tr:3/td:2 which will display the second column of the third row of the second table of the document.

The markup language command processor accepts commands from a valid command language set. The markup language command processor first decodes each command, usually by parsing the command line to check for proper command syntax and/or the existence of any wildcard usage.

Once a command is decoded, the markup language command processor processes the command by executing the precoded route associated with the command. General command-line conventions should be followed for successful command execution.

A bold system prompt appearing in angle brackets means that the user will see on the standard output device a system prompt (often simply a single character from the host system's character set) indicating that the user is free to issue any command recognizable by the command set associated with the particular prompt. This is because a host system may present more than one prompt to the user (though not simultaneously), so that the user can be sure not to confusingly enter local operating system commands to the markup language command processor system prompt, and vice versa. The command itself appears in angle bracket (<>) to indicate that the user must supply a valid command name from the markup language command processor command set and that the command name is entered first on the command line, before any command line arguments, option, wildcards, etc. Command line arguments are separated from the command name by a space and the vertical bar that separates arg1 from arg2 would mean that either arg1 or arg2 must be selected. The user can elect to supply neither arg1 nor arg2 as an argument. A parenthetical argument description element of the conventional markup language command processor syntax denotes a description of an argument. Items that are enclosed in parenthesis should be substituted (including the parenthesis) by a constant or a variable in the command. The range or type of argument will normally be made clear in the context of the command's narrative description. Finally, ellipses are used to denote a repetition of arguments. Commands that are followed by ellipses indicate that multiple arguments (each of up to 256 characters) may follow, to a maximum of 1024 characters. The range or type of arguments will always be made clear in the context of the command's narrative description.

The following is an example of a command from a system access group of markup language commands which conforms to the foregoing rules of syntax:

%exec [-force 1-error] (command)

The percent sign (%) represents the markup language command prompt. exec is the name of the command. The square brackets containing the -force and -error argument is optional. The (command) parenthetical argument is a required argument—in this case, the user must supply a valid operating system command, including script files, as an argument to the exec command. For instance, if the operating system were a Unix variant, %exec-error ls would tell the markup language command processor to execute the unix "list current directory" command (ls) and to interpret any error output of the ls command as an exception.

If the command is a request to display the content of a specified root or branch object from the directory structure, then the markup language command processor will traverse the virtual linked list tree structure presented, and return to the standard display a listing of all the tags (branch objects) found in the tree contained in or subordinate to the specified argument supplied to the command. If the command is a request to change the current working branch object from one branch object to another, the markup language command processor will traverse the virtual linked-list tree structure presented and make the requested branch object (supplied as an argument to the command by the user) appear to the user as though it were the root object of the linked list. If the command is a request to list the content of a tag (i.e. a leaf object in the linked list created from a tag in the markup language document as opposed to an attribute leaf object) then the markup language command processor will traverse the linked list looking for a match with the requested tag (supplied as an arg1 to the command by the user). When a match is found, the markup language command processor will use the (seek position) relative content pointer to identify and return to the standard display device the contents of the tag.

If the command is a request to list the content of an attribute (i.e. a leaf object created from a tag in the markup language document as opposed to a tag leaf object), then the markup language command processor will traverse the linked list.

A host interface function module of the markup language parser and opener is a series of methods that work in conjunction with the methods of previous modules of the markup language parser and opener to allow a host programming language to create programs which augment the host language's current functionality. In this sense, these methods are available as useable features by a programmer experienced in the host programming language. The features provided by the host interface function module are implemented using a predetermined API function call.

The procedural steps that a programmer writing code in the host programming language would use to invoke the host interface function module follow. First, the host interface function module receives a command from the host processing system. The host interface function module is implemented as a call level interface which allows the host processing language to make a function call that invokes the host interface function whenever the host processing system fails to recognize a command. This call level interface is a mechanism for enabling communication between the host processing language and the host interface function module of the markup language parser and opener module by facilitating parameter-passing. Specifically, a recognized command is passed to the host interface function module as a parameter of the host interface function. The kind of command that may be passed using the host interface function includes any of the commands from the markup language access group or the leaf object creation and modification group, as well as the markup language parser and opener module's "open" command.

Thus, a programmer may embed any and all functionality of the markup language parser and opener into his host language program, relying on the host processing language to make the appropriate call to the host interface function module when the need to invoke the methods of the markup language parser and opener arise. If the host programming language is a scripting language like PERL or TCL on a Unix platform, the user is free to compile or write a program where functionality is invoked by a user at will. For instance, a sight-impaired user may wish to change the background color of his browser's home page (i.e. the default web page automatically loaded whenever the user launches the browser) to white for better contrast. To accomplish this, the user simply runs a pre-compiled or interpreted script which he or someone else wrote. At run-time, the host processing system will pass the script commands to open and change the web page background to white. Without a host interface mechanism like the host interface module, the user would need to manually issue one or more complicated markup language parser and opener commands including first the "open" command, followed by a "set" command, which together might look like:

>open http://www.stockquotesgalore.com
>set $html/body/^bgcolor="white"

With the host interface function module, the functionality of these two lines of code can be included in a script which is automatically run for the user at program initialization or at browser launch without any manual intervention. Furthermore, many browser users are not programmers and would not have the desire or knowledge to perform this functionality themselves. Also, with the scripting interface ability of the host interface function module, third party software vendors may write and distribute scripts bundled with their off-the-shelf software, as free ware, as downloadable scriplets, or any other conceivable manner of software distribution.

An HIF module uses memory to store the output of a particular command. For example, if a specific command from the markup language command processor command set is invoked and run by the host interface function module, and that command normally issues a status message or error level code to the standard output device (usually the monitor), here that status message or error level code will be redirected to memory. Frequently, the script program running on the host processing system which made the system call has a need to further process instructions based on the result of the messages or codes returned by the host interface function. Thus, the messages or codes must be memory resistant; the script or program cannot access messages or code from a display device.

The host interface function method determines if the command passed to the host interface function as a parameter to the host interface function matches one of the known commands described earlier. If no match is made, the host interface function module will execute the command as though it were an external command or program (i.e. an external executable file) stored on a host storage device such as a hard disk drive or CD ROM. Here again, the output of the external command or program will be redirected to a location in memory whereby the script or program running on the host processing system may access the command or program output for further processing.

If an error code is returned by the host interface function module, the host processing language must read, interpret, and handle the error condition. In other words, the processing of error conditions is the responsibility of the host, not the host interface module. The host interface module will place a call to the user-supplied host processing language routine specifically written to handle the particular error; however, the user-programmer of the host system is responsible for ensuring the availability of an error processing routine for each returnable error.

The sixth module of the method for providing a framework for processing markup language documents is the CGI script creation module. CGI scripts are commonplace web server software components that a web designer creates to perform real-time processing of user-supplied data on a web server. The output of a CGI script is a markup language document that the web server running the script delivers to the user's browser after processing. Perhaps, the most common use of a CGI script is form processing.

The CGI script creation module augments the foregoing CGI processing scheme by allowing a user-programmer the flexibility to incorporate the previously expounded modules of the markup document processing framework. For example, the CGI script creation module enables creation of markup language formatted documents that contain references to tag variables. In other words, the inclusion of tag variables within an HTML, XML or other markup language document is made possible by the interaction of the CGI script creation module with another markup document processing framework module: namely, the method of representing leaf objects as local variables.

The clear advantage to tag variable inclusion is the insertion into a markup document the contents of a leaf object from some other document.

Thus, a document returned from processing by a CGI script may contain references to tag or attribute values (perhaps using variable notation and/or indirection) found in a memory-resident linked list tree structure from a previous invocation of the markup language parser and opener module.

The flexibility of the CGI script creation module allows a programmer to create a CGI script which returns markup language documents whose background color matches the background color of the user's home page. To accomplish this, the CGI script creates a document whose body tag contains reference to the home page's background color using the following syntax:

<BODY BGCOLOR=$HTML/BODY/^BGCOLOR>
CGI script creation without this functionality would merely be able to set the returned document's background color to a known value, say white. Thus, while one color-blind user may prefer the contrast of black lettering atop a white background, another sight-impaired user's disability may fancy a pink background. The CGI script creation module allows script creation that can satisfy both users in one script, assuming each user has his or her browser home page set to his or her respective preferred background color as described earlier.

As a result, disability-conscience site designers, desiring to cater to the sight-impaired community, for instance, would use this technique to ensure that forms processed by sight-impaired users always return documents high in color contrast, according to each user's specific color-contrast needs.

This example is illustrative of the enormous programmer flexibility built into the method for processing a markup document.

Data Collector.

Returning to FIG. 1, the second functional unit of the B2B system is the data collector 104. The data collector 104 is a computer program that runs on a server 120 controlled by the buyer. The data collector 104 works in tandem with a client database 122 under the control of the buyer. The client database stores data in a particular data storage format. Exemplary data storage formats include SQL, flat files of varying format, CORBA databases, XML documents, and HTML documents. In addition to being stored in a particular data storage format, the data is stored in accordance with a proprietary data model, determined by the needs and desires of the buyer. This proprietary data model is typically different from the proprietary data model used by the supplier, as discussed above. The client database 122 is also associated with a suite of database tools 130, used to manipulate the data stored in the client database 122, and to provide the data to users.

Figures 13, 14:
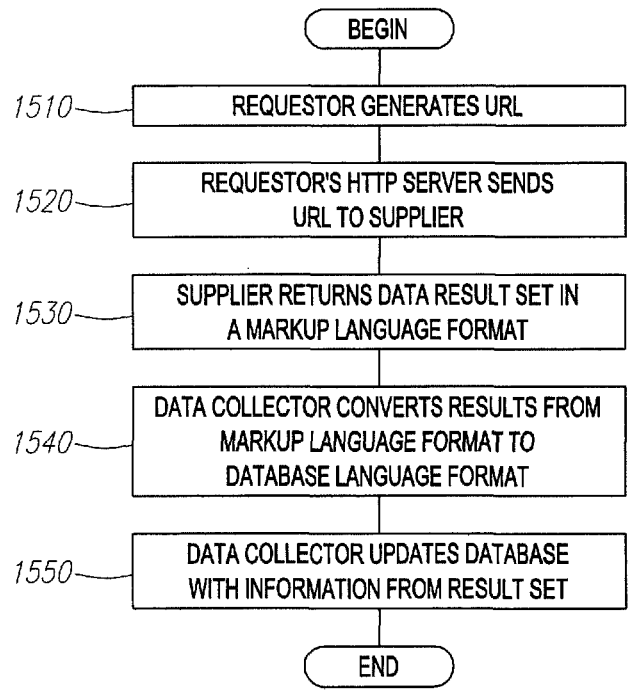
FIG. 13 is an exemplary data model for a buyer, in accordance with an embodiment of the invention.
FIG. 14 is a flowchart of a method for collecting data, in accordance with an embodiment of the invention.

FIG. 13 is an example of how a particular buyer, in this case a distributor of wheels, would model the data describing its inventory. The data is stored in a table 1400. The wheel distributor orders products from many different suppliers, so it has created a supplier ID column 1410, which contains information identifying the source of the product. In order to properly link the records stored in the buyer's database with the catalog data coming from the supplier, a supplier record number field 1420 is provided. The key field 1430 is a locally maintained field that uniquely identifies each record in the buyer's database. The supplier part number field 1440 contains information from the supplier that is used by the supplier to uniquely identify the part. Note that this value can also be used as the linking value between the supplier-provided data and the buyer's database, instead of using the supplier record number field 1420.

The description field 1450 and wholesale price field 1460 contain additional information about the catalog items stored in the buyer's database. In this example, the fields 1420, 1440, 1450, and 1460 all contain data downloaded from the supplier's database. The supplier ID field 1410 is populated with the name of the supplier. This value can be downloaded from the supplier, or it can be supplied locally by the buyer, as will be discussed below. The values for the key field 1430 are determined locally. The exemplary buyer of FIG. 14 has loaded its inventory ordering table 1400 with data from three suppliers, Car Co., Truck Co., and Bike Co., the supplier discussed above.

Returning to FIG. 1, the data collector 104 transmits a data request to the server 110, receives a response from the server 110, the response containing the requested data, and stores the requested data in the client database 122.

The data request can be transmitted in a variety of ways. In a preferred embodiment, the data request is an URL transmitted by the data collector 104 to the server 110. In alternate embodiments, the data request is an e-mail message sent to the server 110 or an application-specific message sent to the server 110 by the data collector or another computer process. In another alternate embodiment, the server 110 initiates the data request, and the results are pushed across the network to the data collector 104.

The data request contains information that identifies the data to be retrieved. In a preferred embodiment, the request comprises information that identifies a pre-generated database query, the query being stored on the server 110. The details of the pre-defined queries of this embodiment are discussed above in the enabler agent section. In another preferred embodiment, the request comprises a database query generated at the time of the request. Details of the request of this embodiment are also discussed above in the enabler agent section.

Turning to FIG. 14, a method for retrieving data from a data server begins at step 1510, with a data requestor generating a URL. An HTTP server on the client routes the URL over the network to the supplier's server, at step 1520. The supplier returns a data result set in response to the data request, at step 1530. This result set is returned in a markup language format. The data collector receives the markup language formatted result set from the server, and converts the result set into the particular structured database format used by the client database, at step 1540. The final step comprises the data collector updating the client database with the information from the result set, at step 1550.

The data collector can generate the URL of step 1510 in several different ways. The data collector in a preferred embodiment contains a listing of URLs of the various suppliers that the data collector communicates with. Alternatively, the data collector prompts a user to provide a URL. In an embodiment where the server pushes the result set to the client without needing a request from the client, steps 1510 and 1520 of the method of FIG. 14 are omitted.

In an embodiment where the data collector maintains a list of URLs of suppliers, a scheduling is used to automatically provide URLs for querying supplier databases. The list of URLs is maintained in a database table, containing a series of records, one for each URL to be queried exemplary URL storage table is shown in FIG. 15.

The URL column 1610 contains the URL of the server to be polled by the data collector. The Sys Descr column 1620 contains optional additional information about the server. The Last Polled column 1630 contains the date and time the server was last polled for new data. The Sys Status column 1640 contains a status code indicating the status of the data server as of the last polled time. In this example, the allowable status codes are listed in Table 2.

TABLE 2

| Code | Name | Description |
| --- | --- | --- |
| 1 | Online | Server functioning normally |
| 2 | Offline | Server not accessible |
| 3 | Disabled | Polling for this server is disabled |
| 4 | HTTP Error | HTTP error reported by HTTP server |
| 5 | XML Error | XML error reported by HTTP server |
| 6 | Other Error | Misc. errors reported |

The key field 1650 is a unique identifier used to link records to other data in the client system, such as expanded supplier-related data. The values typically increase monotonically from one.

Once URL data table is created, the table is populated with URLs that the buyer wishes to automatically poll for data. The user can either supply the URL directly to the table, or preferably the user uses a web-based form or CGI screen to enter the URL into the URL table.

Once the URL data table has been populated with at least one URL, a polling schedule is created. This schedule minimally determines the rate at which URLs are polled for new data. The polling schedule can also be used to perform other periodic actions such as executing external programs. The polling schedule is set up by the administrator of the data collector based upon the particular needs of the buyer. This setup is preferably done using a web-based CGI screen.

Once the polling schedule is defined, the actual URL polling is done. An automated process is periodically triggered by the polling schedule, based upon the parameters defined by the administrator. The polling function steps through the list of URLs stored in the URL table, and transmits the URLs to the HTTP server on the client, thus generating the URL as specified in step 1510 of FIG. 14.

Figure 16:
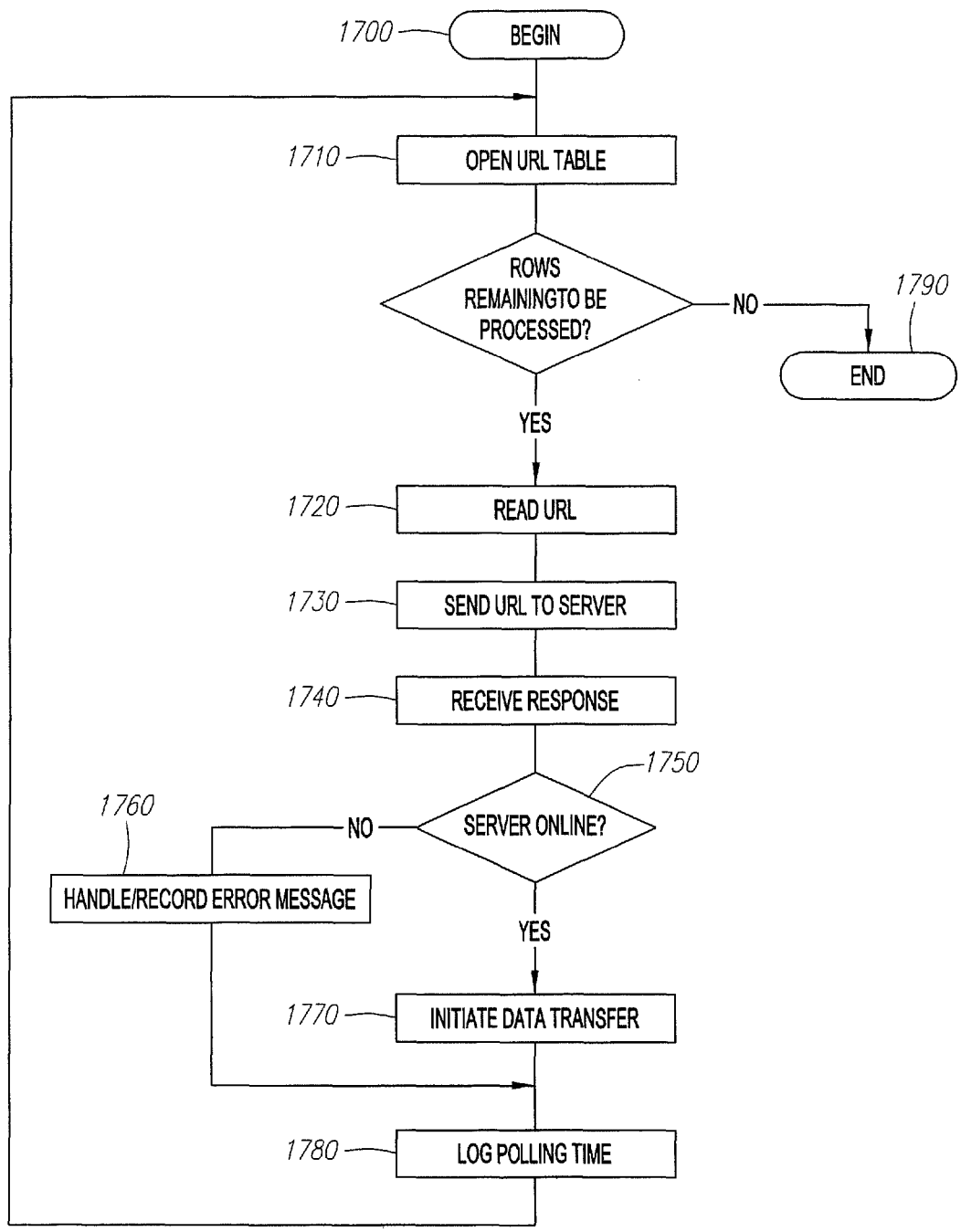
FIG. 16 is a flowchart of a method for polling data sources, in accordance with an embodiment of the invention.

A method of polling the servers identified by the URLs in the URL list is shown in FIG. 16. The method commences at step 1700, when the data collector opens the URL table. The data collector typically opens the URL table in response to a command from the polling schedule. Alternatively, the data collector can open the URL table in response to a command from a user, or from another process running on the client.

Once the URL table is opened, the poller steps through the entries in the URL table. At step 1710, a check is made to see if any rows remain to be processed. If all the URLs have been polled, the method exits at step 1790.

Assuming that there are still URLs to be polled, the method proceeds to step 1720, where the URL value is read from the current row of the URL table. At step 1730, this value is routed to the HTTP server on the client, then over the network, and then to the HTTP server at the supplier. Depending on the status of the supplier's server, one of the different responses, shown in Table 2, is received back from the server, at step 1740. A check is made at step 1750, to verify that the server is on-line and the data is available for transmission. If the check is successful, then at step 1770 the data transfer is initiated. If the check fails, then at step 1760 the reason for failure is recorded in the URL table.

Once the data transfer is initiated, or where the server is unavailable and an error is returned, the poller then records the polling time, at step 1780. The method then returns to step 1710, for processing of the next row. The HTTP server residing on the client handles the actual data transfers. Methods of transferring data using HTTP servers are well known to those skilled in the art and are not critical to the invention.

As the data collector polls the various data suppliers it is collecting data from, a collection of incoming data documents is created. The data collector converts the incoming data documents from the markup language format they are transmitted in into the structured data storage format used by the client database. This conversion, noted as step 1540 of FIG. 14, follows the method shown in FIG. 17, as applied to the exemplary XML data file of FIG. 6.

Figure 17:
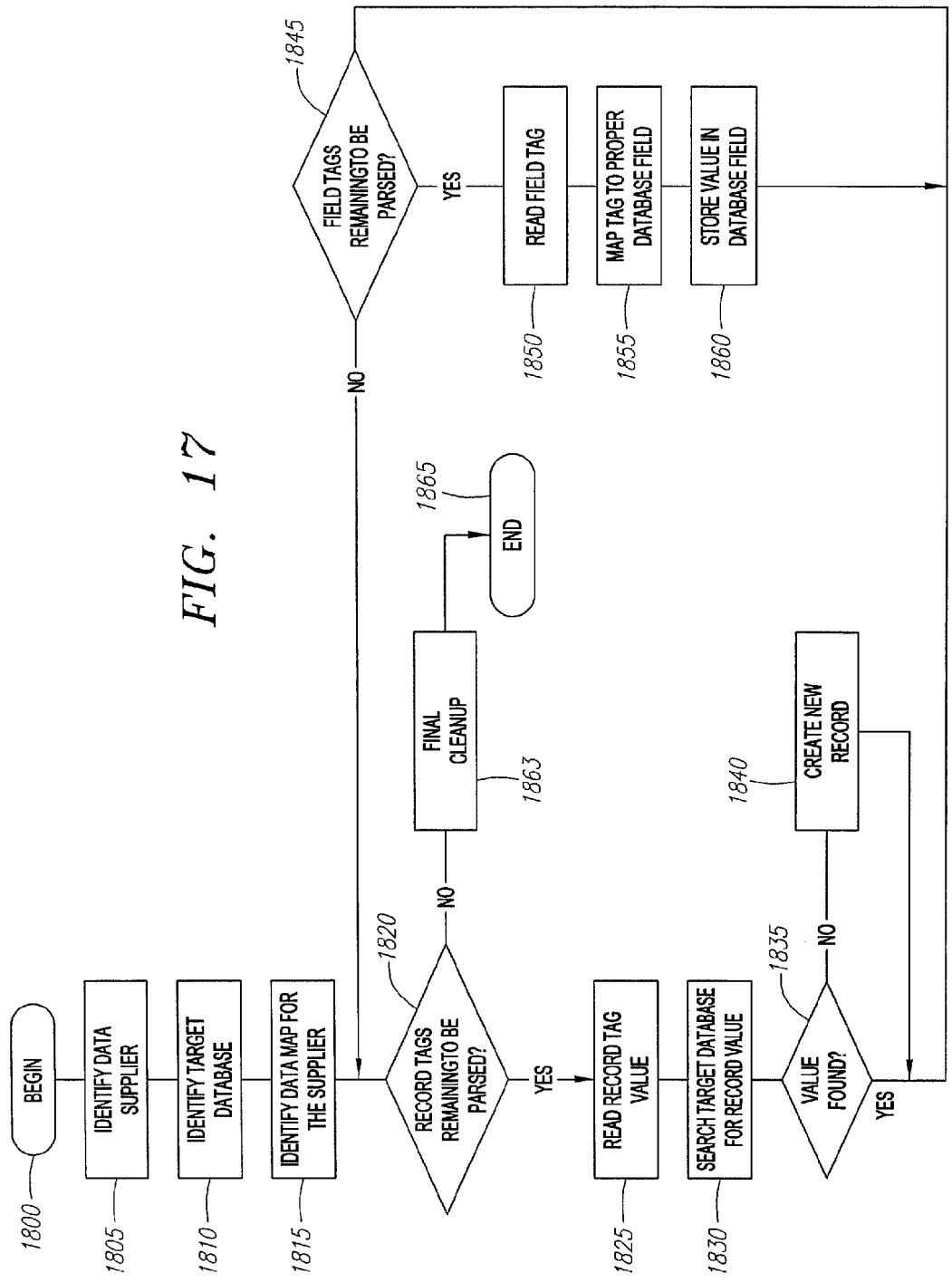
FIG. 17 is a flowchart of a method for a method of converting data from a markup language format into a structured data storage format.

The data conversion method of FIG. 17 begins at step 1800, where the data collector receives the XML data file. At step 1805, the data collector parses the query row 502 and identifies the data supplier for the data document. At step 1810, the data collector determines the proper target database for the data contained in the incoming document. Where there are multiple possible targets, the data collector determines which table to store the data in by, for example, checking the value contained in the query row 502 against values stored in a URL table stored on the client.

At step 1815, the data collector identifies the data map to use in associating the contents of the various XML tags with the corresponding database items. Depending on the particular requirements of the implementation, this data map can be a simple correlation of field tags to database fields, or it can be a complex mapping of record tags to records in one table or many different tables within a large multi-table relational database system. In simpler systems, the data map is omitted, and the various tags are directly mapped to database items bearing the same name. If data type information is provided in the XML document, this information is also parsed and stored for future use. Data type information would typically be used where a new table is being created to store incoming data.

Once the initial setup information has been processed, the data collector then steps through the file, unpacking the records and fields stored in the file. At step 1820, a check is made to see if any records remain to be converted. If all records have been converted, the method proceeds to step 1863, where any necessary final cleanup is done, such as deleting from the client database records that no longer appear in the XML data document, closing database tables, storing backup copies of files, etc. The method then terminates at step 1865.

Assuming that there are records remaining to be processed, at step 1825, the current record identifier is read by the data collector. The data map is also checked at this step, to see if there is a mapping defined for this tag. The proper target database item is then searched, at step 1830, for the record corresponding to the current record tag. A check is made at step 1835 to see if a corresponding record was found. If no record corresponds to the current record tag, then at step 1840 the data collector issues a command to the database instructing the database to create a new record for storing the current record tag.

Once the new record is created, or if the corresponding record was found, then the collection of field tags associated with the current record tag is parsed. At step 1845, a check is made to see if any field tags remain to be parsed. If all field tags associated with the record have been parsed, control passes back to step 1820, where the next record is processed. Assuming there are fields remaining to be parsed, at step 1850 the field tag is read by the data collector. At step 1855, the data collector maps the field tag in the XML data document to the proper field in the database record. Where a data map is available, the data collector applies the mapping defined in the data map to make the like between the field tag and the database field. Otherwise, the data collector will default to linking the field tag to the database field bearing the same name as the field tag. Once the proper field has been identified, at step 1860 the field tag value is written to the database field. Control then passes back to step 1845, where the next field tag is processed.

Additional functionality can also be incorporated into the data collector. For example, in an embodiment the data collector has an alarm system. This alarm system triggers an alarm when the content of a database item changes. The administrator can set up an alarm that is triggered when, for example, the value of the price field for a record changes, or a new record is added to the database. Referring to FIG. 17, the alarm system is invoked either at step 1840 when a new record is created, at step 1860 when a field value is stored, assuming the newly stored value is not the same as the old value, and/or at step 1803 when obsolete data is deleted from the system.

The alarm system interacts with an action and notification system. The action and notification system allows the administrator to define one or more actions that are performed when a particular alarm is triggered. For example, when a new record is added to the database, an e-mail message is sent to selected users in the buyer's organization, advising them of the newly available goods. Other actions include running an external program, performing an HTTP post operation, or running an Emily or third-party script.

The data collector also contains a collection of utility programs to facilitate the setup and operate of the data collector. In a preferred embodiment, these programs are implemented as web-based CGI scripts. Exemplary utility programs include screens which allow a user to: specify URLs to be polled, define a data map for data from a particular URL, set up alarms for the various data items stored in the client database, set up notifications that will be triggered by the alarms, set up system login accounts for other users of the data collection system, and perform other activities needed to configure and maintain the data collector. Other setup and configuration screens can also be provided, depending on the particular requirements of a given embodiment.

In addition to the administrative tools described above, the data collection system optionally includes a suite of database manipulation tools. In an embodiment, these tools include: a web-based search engine, whereby a user can search the database by running a pre-defined query on the client database; a web-based screen creator, whereby a user can make simple markup language screens that display data from the client database; a script editor, whereby a user can create scripts in a scripting language, to execute more complex operations on the database or to create dynamic screens; and/or a form creator, whereby a user can create markup language forms for updating the client database or for posting client database items to other HTTP servers. These tools can be provided as part of the data collection system, or they can be third-party application programs provided by the user. Exemplary third-party application programs include ASP, Cold Fusion, or ISQL. The particular database manipulation tools chosen are design choices for those skilled in the art and are not critical to the invention.

In an embodiment, the data collector also includes security features, to limit usage to authorized personnel and to safeguard the database. These features include an administrative/security console program. This console program is preferably a non-web-based application that is only available to selected administrative personnel. For example, the console program could be program maintained only on a special machine, or located in a protected directory on the client machine. The console program may also be a web-based screen or series of screens.

The console program allows administrators to set passwords and permissions on the various screens of the data collector and associated toolkits, as well as on any embedded HTTP server. The console program permits the administrator to use HTTP authentication, securing any screen or directory associated with the data collector with a pop-up login interface. The console program also includes a utility to set up and maintain a trusted host list (by IP address or by network). The trusted host list is a list of host machines that are allowed to access various files and screens within the client.

System Architecture Overview

Figure 10:
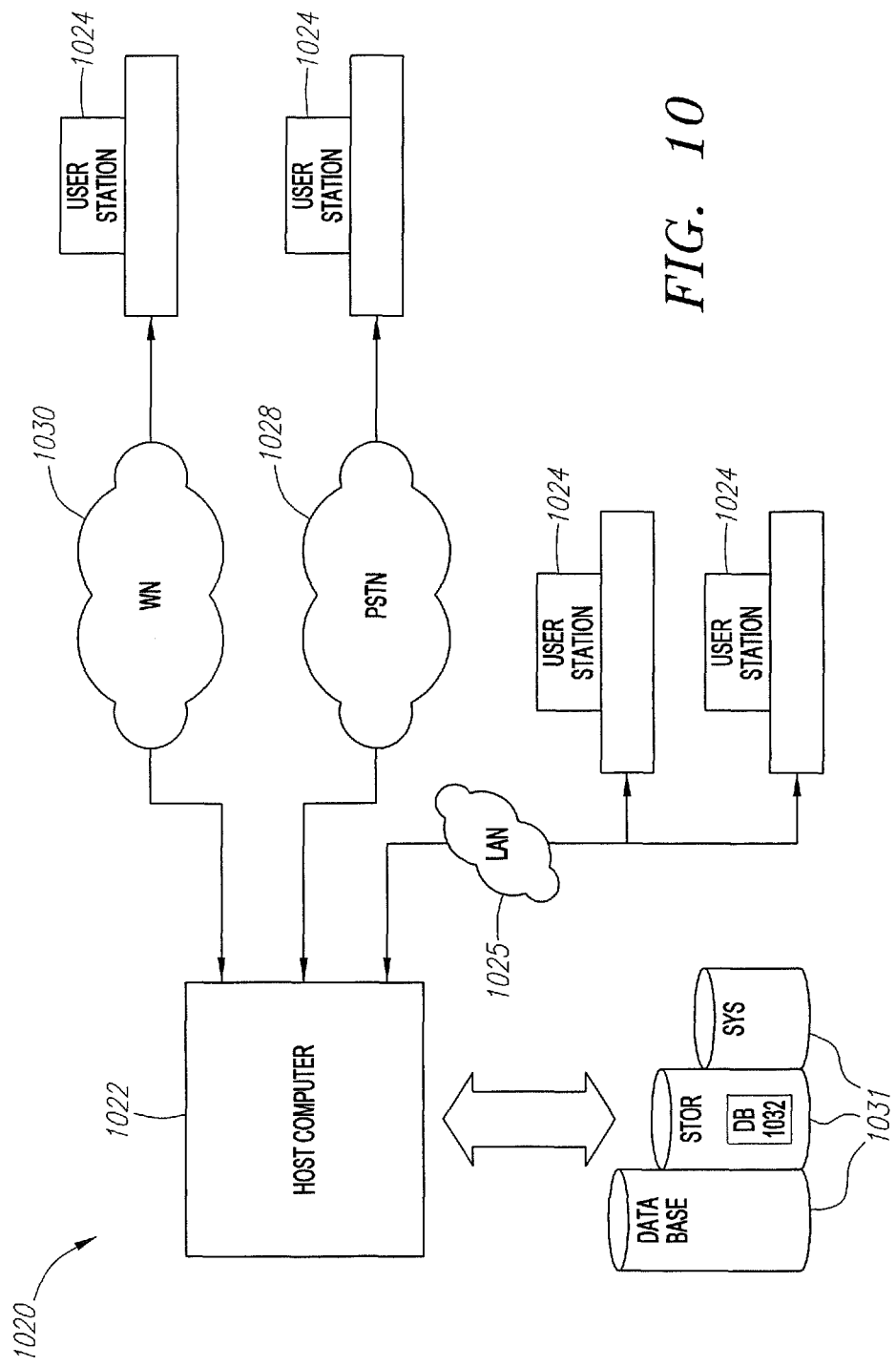
FIG. 10 is a representation of a computer system in accordance with an embodiment of the invention.

Referring to FIG. 10, in an embodiment, a computer system 1020 includes a host computer 1022 connected to a plurality of individual user stations 1024. In an embodiment, the user stations 1024 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1024 are connected to the host computer 1022 via a local area network ("LAN") 1025. Other user stations 1024 are remotely connected to the host computer 1022 via a public telephone switched network ("PSTN") 1028 and/or a wireless network 1030.

In an embodiment, the host computer 1022 operates in conjunction with a data storage system 1031, wherein the data storage system 1031 contains a database 1032 that is readily accessible by the host computer 1022.

In alternative embodiments, the database 1032 may be resident on the host computer, stored, e.g., in the host computer's ROM, PROM, EPROM, or any other memory chip, and/or its hard disk. In yet alternative embodiments, the database 1032 may be read by the host computer 1022 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 1022 can access two or more databases 1032, stored in a variety of mediums, as previously discussed.

Figure 11:
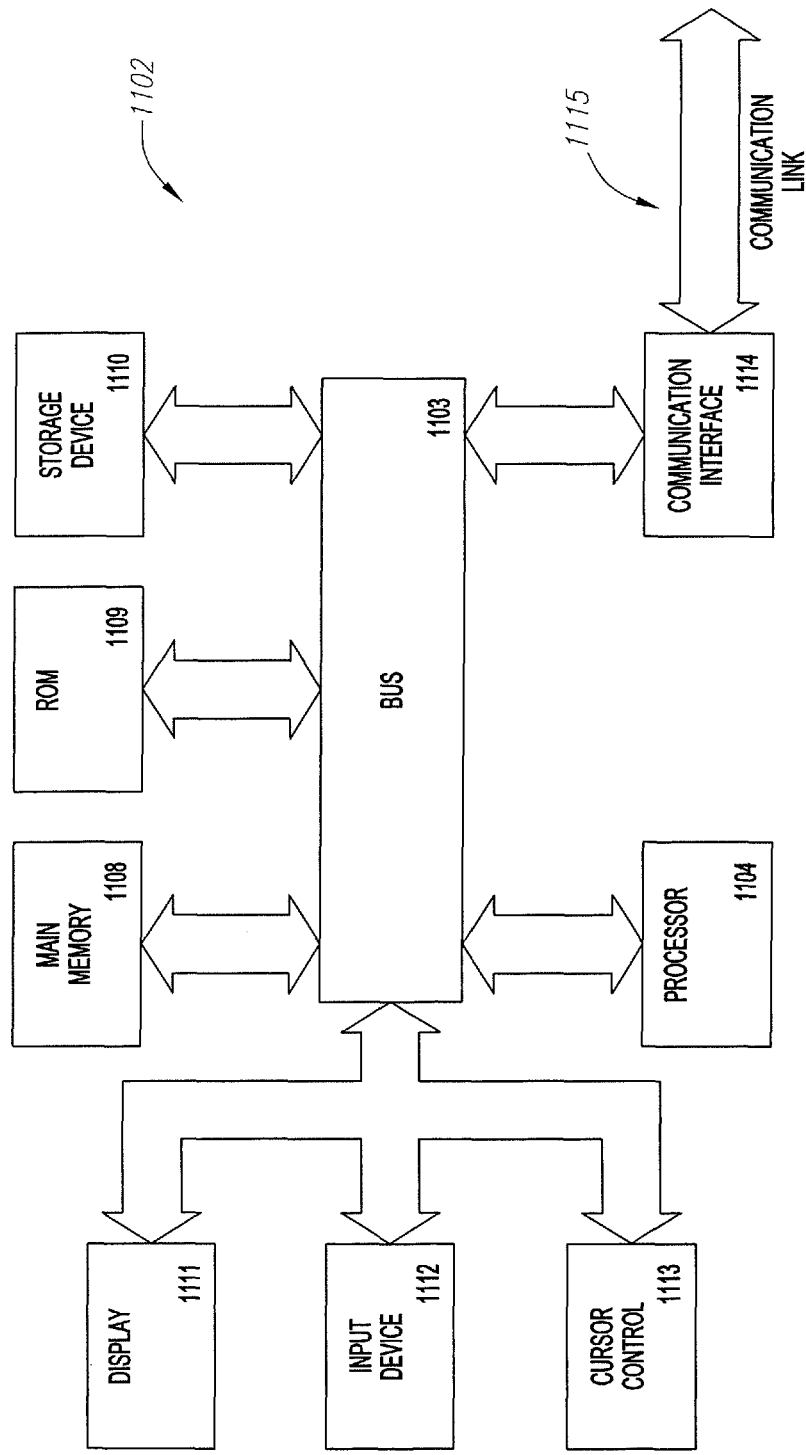
FIG. 11 is a representation of a processing unit in accordance with an embodiment of the invention.

Referring to FIG. 11, in an embodiment, each user station 1024 and the host computer 1022, each referred to generally as a processing unit, embodies a general architecture 1102. A processing unit includes a bus 1103 or other communication mechanism for communicating instructions, messages and data, collectively, information, and one or more processors 1104 coupled with the bus 1103 for processing information. A processing unit also includes a main memory 1108, such as a random access memory (RAM) or other dynamic storage device, coupled to the bus 1103 for storing dynamic data and instructions to be executed by the processor(s) 1104. The main memory 1108 also may be used for storing temporary data, i.e., variables, or other intermediate information during execution of instructions by the processor(s) 1104.

A processing unit may further include a read only memory (ROM) 1109 or other static storage device coupled to the bus 1103 for storing static data and instructions for the processor(s) 1104. A storage device 1110, such as a magnetic disk or optical disk, may also be provided and coupled to the bus 1103 for storing data and instructions for the processor(s) 1104.

A processing unit may be coupled via the bus 1103 to a display device 1111, such as, but not limited to, a cathode ray tube (CRT), for displaying information to a user. An input device 1112, including alphanumeric and other keys, is coupled to the bus 1103 for communicating information and command selections to the processor(s) 1104. Another type of user input device may include a cursor control 1113, such as, but not limited to, a mouse, a trackball, a fingerpad, or cursor direction keys, for communicating direction information and command selections to the processor(s) 1104 and for controlling cursor movement on the display 1111.

According to one embodiment of the invention, the individual processing units perform specific operations by their respective processor(s) 1104 executing one or more sequences of one or more instructions contained in the main memory 1108. Such instructions may be read into the main memory 1108 from another computer-usable medium, such as the ROM 1109 or the storage device 1110. Execution of the sequences of instructions contained in the main memory 1108 causes the processor(s) 1104 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1104. Such a medium may take many forms, including, but not limited to, non-volatile, volatile and transmission media. Non-volatile media, i.e., media that can retain information in the absence of power, includes the ROM 1109. Volatile media, i.e., media that can not retain information in the absence of power, includes the main memory 1108. Transmission media includes coaxial cables, copper wire and fiber optics, including the wires that comprise the bus 1103. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 1104 can retrieve information.

Various forms of computer-usable media may be involved in providing one or more sequences of one or more instructions to the processor(s) 1104 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1103 may receive the infrared signals and place the instructions therein on the bus 1103. The bus 1103 may carry the instructions to the main memory 1108, from which the processor(s) 1104 thereafter retrieves and executes the instructions. The instructions received by the main memory 1108 may optionally be stored on the storage device 1110, either before or after their execution by the processor(s) 1104.

Each processing unit may also include a communication interface 1114 coupled to the bus 1103. The communication interface 1114 provides two-way communication between the respective user stations 1024 and the host computer 1022. The communication interface 1114 of a respective processing unit transmits and receives electrical, electromagnetic or optical signals that include data streams representing various types of information, including instructions, messages and data.

A communication link 1115 links a respective user station 1024 and a host computer 1022. The communication link 1115 may be a LAN 1025, in which case the communication interface 1114 may be a LAN card. Alternatively, the communication link 1115 may be a PSTN 1028, in which case the communication interface 1114 may be an integrated services digital network (ISDN) card or a modem. Also, as a further alternative, the communication link 1115 may be a wireless network 1030.

A processing unit may transmit and receive messages, data, and instructions, including program, i.e., application, code, through its respective communication link 1115 and communication interface 1114. Received program code may be executed by the respective processor(s) 1104 as it is received, and/or stored in the storage device 1110, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

The invention claimed is:

1. A method for processing a markup language file having one or more portions, the method comprising steps performed by a processor of:
   automatically downloading a first markup language file using the hypertext transfer protocol and referencing the first markup language file by its uniform resource location (URL) or by a name of a local file on a system on which a user is operating, the first markup language file including arbitrarily named tags;
   in response to an automatic determination that the step of downloading is complete, automatically parsing the first markup language file for one or more portions of the first markup language file;
   in response to an automatic determination that the step of parsing is complete, automatically storing each portion of the first markup language file into a directory structure containing one or more folders and one or more documents stored within the one or more folders, the directory structure complying with the structure of the first markup language file, wherein each of the one or more folders depends from the tag names in the markup language file; and
   in response to an automatic determination that the step of storing is complete, automatically modifying the content of one or more markup language documents.

2. The method of claim 1, wherein if there are any relative URLs, automatically converting the relative URLs into absolute URLs.

3. The method of claim 1, further comprising providing a command language set allowing selection, viewing, and other processing of the one or more portions of the first markup language document, the command language set comprising a plurality of commands for selection.

4. The method of claim 3, wherein the command language set comprises allowing creation of one or more executable batch files containing a subset of the set of commands, the method further comprising defining local variables for processing in conjunction with variables and attributes of the files.

5. The method of claim 4, further comprising a command for creating loop processing.

6. The method of claim 4, further comprising a command for jumping to a new specified location within the batch file and resuming execution at the new location.

7. The method of claim 3, further comprising creating XML, formatted documents that contain references to tag variables, allowing insertion into a markup language document the contents of a folder, subfolder or file from a second markup language document.

8. The method of claim 1 wherein the URL is read from a browser via a CGI transaction.

9. The method of claim 1 wherein the URL is read from a database.

10. The method of claim 1 wherein the URL is embedded in computer program code.

11. The method of claim 1 wherein the URL is in a local variable.

12. The method of claim 1, further comprising a step performed by the processor of automatically modifying the content of at least one web page.

13. The method of claim 1, further comprising a step performed by the processor of automatically translating the content of at least one web page.

14. A system for processing a markup language file having one or more portions, the system having a computer having at least a processor, a memory operably coupled to the memory, the memory being configured for storing a computer program executable by the processor, the computer program comprising:

computer program code for automatically downloading by the processor a first markup language file using the hypertext transfer protocol and automatically referencing by the processor the first markup language file by its uniform resource location (URL) or by a name of a local file on a system on which a user is operating, the first markup language file including arbitrarily named tags;

computer program code, responsive to an automatic determination that the steps of downloading and referencing are complete, for automatically parsing by the processor the first markup language file for one or more portions of the first markup language file;

computer program code, responsive to an automatic determination that the step of parsing is complete, for automatically storing by the processor each portion of the first markup language file into a directory structure containing one or more folders, and one or more documents, complying with the structure of the first markup language file, wherein each of the one or more folders depends from the tag names in the markup language file; and computer program code, responsive to an automatic determination that the step of storing is complete, for automatically modifying the content of one or more markup language documents.

15. The system of claim 14 wherein the computer program further comprises computer program code for reading the URL from a browser via a CGI transaction.

16. The system of claim 14 wherein the computer program further comprises computer program code for reading the URL from a database.

17. The system of claim 14 wherein the computer program further comprises computer program code for reading the URL embedded in computer program code.

18. The system of claim 14 wherein the URL is in a local variable.

19. The system of claim 14 wherein the computer program further comprises computer program code for automatically modifying or translating the content of at least one web page.

20. A method for processing a markup language file having one or more portions, the method comprising steps performed by a processor of:

automatically downloading a first markup language file using the hypertext transfer protocol and referencing the first markup language file by its uniform resource location (URL) or by a name of a local file on a system on which a user is operating, the first markup language file including arbitrarily named tags;

responsive to an automatic determination that the step of downloading is complete, automatically parsing the first markup language file for one or more portions of the first markup language file;

responsive to an automatic determination that the step of parsing is complete, automatically storing each portion of the first markup language file into a directory structure containing one or more folders and one or more documents stored within the one or more folders, the directory structure complying with the structure of the first markup language file, wherein each of the one or more folders depends from the tag names in the markup language file;

responsive to an automatic determination that the step of storing is complete, automatically modifying the content of one or more markup language documents;

automatically converting relative URLs into absolute URLs; and providing a command language set allowing selection, viewing, and other processing of the one or more portions of the first markup language document, the command language set comprising a plurality of commands for selection.

* * * * *